(12) United States Patent
Makurin et al.

(10) Patent No.: US 11,362,714 B2
(45) Date of Patent: Jun. 14, 2022

(54) METHOD AND APPARATUS FOR PERFORMING BEAMFORMING IN WIRELESS COMMUNICATION SYSTEM

(71) Applicant: Samsung Electronics Co., Ltd., Suwon-si (KR)

(72) Inventors: Mikhail Nikolaevich Makurin, Domodedovo (RU); Artem Rudolfovitch Vilenskiy, Moscow (RU); Chongmin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/277,530

(22) PCT Filed: Sep. 24, 2019

(86) PCT No.: PCT/KR2019/012382
§ 371 (c)(1),
(2) Date: Mar. 18, 2021

(87) PCT Pub. No.: WO2020/067691
PCT Pub. Date: Apr. 2, 2020

(65) Prior Publication Data
US 2022/0038148 A1 Feb. 3, 2022

(30) Foreign Application Priority Data

Sep. 24, 2018 (RU) .................. 2018133635

(51) Int. Cl.
*H04B 7/06* (2006.01)
*H04B 17/318* (2015.01)
*H04L 5/00* (2006.01)

(52) U.S. Cl.
CPC ......... *H04B 7/0617* (2013.01); *H04B 17/318* (2015.01); *H04L 5/0048* (2013.01)

(58) Field of Classification Search
CPC .... H04B 7/0617; H04B 17/318; H04L 5/0048
(Continued)

(56) References Cited

U.S. PATENT DOCUMENTS

| 4,843,397 A | 6/1989 | Galati et al. |
| 5,572,219 A | 11/1996 | Silverstein et al. |

(Continued)

FOREIGN PATENT DOCUMENTS

| EP | 1 087 545 A1 | 3/2001 |
| EP | 0 815 692 B1 | 6/2002 |

(Continued)

OTHER PUBLICATIONS

Extended European Search Report dated Sep. 17, 2021, issued in a counterpart European Application No. 19866289.2.

(Continued)

*Primary Examiner* — Fitwi Y Hailegiorgis
(74) *Attorney, Agent, or Firm* — Jefferson IP Law, LLP

(57) ABSTRACT

A first terminal according to an embodiment of the disclosure may obtain information regarding reception power of a reference signal transmitted to a second terminal, obtain information regarding reception power of a source signal transmitted to the second terminal, obtain information regarding reception power of a first combined signal that is transmitted to the second terminal and is a combination of the reference signal and the source signal, obtain information regarding reception power of a second combined signal that is transmitted to the second terminal and is a combination of a modified source signal obtained by shifting a phase of the source signal and the reference signal, and determine a transmission beam of the first terminal, based on the information regarding the reception power of each of the reference signal, the source signal, the first combined signal and the second combined signal.

15 Claims, 15 Drawing Sheets

(58) Field of Classification Search
USPC .......................................................... 375/267
See application file for complete search history.

(56) References Cited

U.S. PATENT DOCUMENTS

| | | | |
|---|---|---|---|
| 5,708,679 | A | 1/1998 | Fernandes et al. |
| 5,708,971 | A | 1/1998 | Dent |
| 6,108,565 | A | 8/2000 | Scherzer |
| 6,122,260 | A | 9/2000 | Liu et al. |
| 6,124,824 | A | 9/2000 | Xu et al. |
| 6,157,340 | A | 12/2000 | Xu et al. |
| 6,195,045 | B1 | 2/2001 | Xu et al. |
| 6,249,680 | B1 | 6/2001 | Wax et al. |
| 6,347,234 | B1 | 2/2002 | Scherzer |
| 6,694,155 | B1 | 2/2004 | Chin et al. |
| 6,788,199 | B2 | 9/2004 | Crabtree et al. |
| 6,980,527 | B1 | 12/2005 | Liu et al. |
| 7,106,972 | B2 | 9/2006 | Alfano et al. |
| 7,133,710 | B2 | 11/2006 | Acosta et al. |
| 7,299,080 | B2 | 11/2007 | Acosta et al. |
| 7,378,954 | B2 | 5/2008 | Wendt |
| 7,400,907 | B2 | 7/2008 | Jin et al. |
| 7,593,826 | B2 | 9/2009 | Weese |
| 7,835,057 | B2 | 11/2010 | Kayser et al. |
| 8,045,926 | B2 | 10/2011 | Martikkala et al. |
| 8,131,232 | B2 | 3/2012 | Muhammad |
| 8,320,903 | B2 | 11/2012 | Ding et al. |
| 8,368,647 | B2 | 2/2013 | Lin |
| 8,610,771 | B2 | 12/2013 | Leung et al. |
| 8,675,762 | B2 | 3/2014 | Cheng et al. |
| 8,859,969 | B2 | 10/2014 | Micheels et al. |
| 8,896,423 | B2 | 11/2014 | Brumer et al. |
| 8,976,845 | B2 | 3/2015 | O'Keeffe et al. |
| 8,994,553 | B2 | 3/2015 | Brumer et al. |
| 9,252,864 | B2 | 2/2016 | Seol et al. |
| 9,295,006 | B2 | 3/2016 | Jalali et al. |
| 9,297,749 | B2 | 3/2016 | Micheels et al. |
| 9,411,995 | B2 | 8/2016 | Brumer et al. |
| 9,516,513 | B2 | 12/2016 | Saegrov et al. |
| 9,587,804 | B2 | 3/2017 | Chen |
| 9,658,058 | B1 | 5/2017 | Jones |
| 9,755,720 | B2 | 9/2017 | Jiao |
| 9,763,579 | B2 | 9/2017 | Sadleir et al. |
| 10,141,987 | B2 | 11/2018 | Kim et al. |
| 10,243,718 | B2 * | 3/2019 | Hong ................... H04B 1/0475 |
| 10,333,602 | B2 | 6/2019 | Yoo et al. |
| 10,431,888 | B2 | 10/2019 | Seol et al. |
| 2006/0173255 | A1 | 8/2006 | Acosta et al. |
| 2006/0195023 | A1 | 8/2006 | Acosta et al. |
| 2006/0211927 | A1 | 9/2006 | Acosta et al. |
| 2008/0114228 | A1 | 5/2008 | McCluskey et al. |
| 2009/0093222 | A1 | 4/2009 | Sarkar |
| 2010/0318440 | A1 | 12/2010 | Coveley |
| 2012/0002639 | A1 | 1/2012 | Lu et al. |
| 2013/0002472 | A1 | 1/2013 | Crouch |
| 2015/0236760 | A1 | 8/2015 | Sun et al. |
| 2016/0099614 | A1 | 4/2016 | Leabman et al. |
| 2017/0095667 | A1 | 4/2017 | Yakovlev et al. |
| 2017/0194807 | A1 | 7/2017 | Zeine et al. |
| 2017/0302109 | A1 | 10/2017 | Lee et al. |
| 2018/0007678 | A1 | 1/2018 | Costa et al. |
| 2018/0145542 | A1 | 5/2018 | Choi et al. |
| 2019/0044584 | A1 | 2/2019 | Lee et al. |

FOREIGN PATENT DOCUMENTS

| | | |
|---|---|---|
| EP | 0 953 235 B1 | 6/2002 |
| EP | 1 062 746 B1 | 3/2007 |
| EP | 0 804 858 B1 | 2/2008 |
| EP | 1 770 827 B1 | 5/2008 |
| EP | 2 058 016 A1 | 5/2009 |
| EP | 1 901 086 B1 | 5/2014 |
| EP | 2 885 881 A2 | 6/2015 |
| EP | 2 920 897 B1 | 8/2017 |
| EP | 2 920 896 B1 | 9/2017 |
| EP | 2 396 851 B1 | 10/2017 |
| EP | 1 920 577 B1 | 3/2018 |
| JP | 2006-108731 A | 4/2006 |
| KR | 10-2014-0016854 A | 2/2014 |
| KR | 10-2017-0004183 A | 1/2017 |
| RU | 2 437 220 C2 | 12/2011 |
| RU | 2 467 346 C1 | 11/2012 |
| RU | 2 492 573 C2 | 9/2013 |
| RU | 2 502 189 C2 | 12/2013 |
| WO | 2004/039022 A2 | 5/2004 |
| WO | 2014/030065 A2 | 2/2014 |
| WO | 2016/186378 A1 | 11/2016 |
| WO | 2017/135593 A1 | 8/2017 |

OTHER PUBLICATIONS

International Search Report and Written Opinion dated Jan. 3, 2020, issued in International Patent Application No. PCT/KR2019/012382.

Russian Notice of Allowance dated Apr. 16, 2019, issued in Russian Patent Application No. 2018133635.

* cited by examiner

METHOD AND APPARATUS FOR PERFORMING BEAMFORMING IN WIRELESS COMMUNICATION SYSTEM

TECHNICAL FIELD

The disclosure relates to a method and apparatus for performing beamforming in a wireless communication system, and more particularly, to a method and apparatus for controlling a phase of an antenna during signal transmission.

BACKGROUND ART

Existing wireless data/energy transmission systems are designed to operate in a free space or at a line-of-sight (LOS) distance. In this case, a transmitter antenna array may be controlled such that a phase and amplitude of a beam output from an antenna element are adjusted to ensure maximum power in a given direction and at a receiving point (focus). Therefore, when there are a plurality of receivers, all elements of the transmitter antenna array should be synchronously controlled for focusing on each of the plurality of receivers, and a transmitter should be capable of simultaneously providing channels for the plurality of receivers.

However, when there is an obstacle between a transmitter (TX) and a receiver (RX), multipath propagation and wavefront distortion (for example, refraction or reflection) may occur, thus resulting in a sharp decrease in transmission efficiency or blocking signal transmission in severe cases. In this case, it is not possible to compensate for the focus of a signal on the receiver in a spatial domain and thus it is sometimes necessary to move the receiver to maintain high energy efficiency of the system.

In order to solve the above-described problem, it is necessary to develop a transmission method and apparatus for receiving a maximum level of reception power as much as possible by the receiver even when there is an obstacle in a signal path between the transmitter and the receiver. In particular, when an obstacle is moving, a transmitter antenna system should be controlled quickly to process information according to changing characteristics of a propagation medium. When the recent trend of reducing the size and scale of electronic devices is taken into account, a transmission method and apparatus for reducing the size of a terminal while satisfying the above-described functions is needed.

DESCRIPTION OF EMBODIMENTS

Technical Problem

Embodiments of the disclosure set forth herein are directed to providing a transmission beam control method and apparatus for maximizing the intensity of a received signal at a terminal receiving a signal.

Solution to Problem

A first terminal according to an embodiment of the disclosure may obtain information regarding reception power of a reference signal transmitted to a second terminal, obtain information regarding reception power of a source signal transmitted to the second terminal, obtain information regarding reception power of a first combined signal that is transmitted to the second terminal and is a combination of the reference signal and the source signal, obtain information regarding reception power of a second combined signal that is transmitted to the second terminal and is a combina-tion of a modified source signal obtained by shifting a phase of the source signal and the reference signal, and determine a transmission beam of the first terminal, based on the information regarding the reception power of each of the reference signal, the source signal, the first combined signal and the second combined signal.

Advantageous Effects of Disclosure

A beamforming apparatus and method according to an embodiment of the disclosure set forth herein are capable of maximizing a level of reception power by using only information regarding the magnitude of a received signal, which is provided from a terminal receiving the received signal.

BEST MODE

Figure 1:
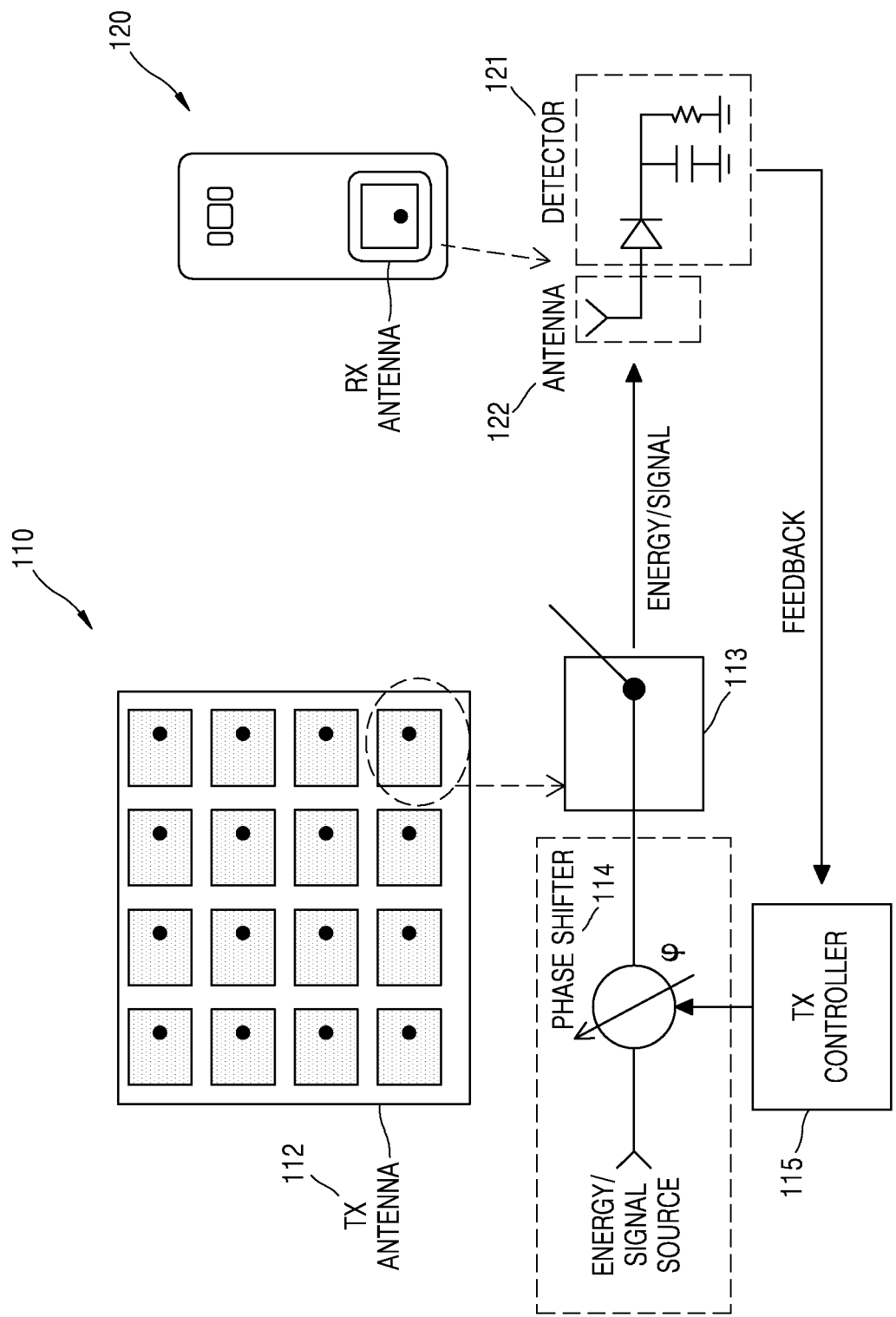
FIG. 1 is a diagram for describing a wireless signal/energy transmission/reception system according to an embodiment of the disclosure.

According to an aspect of the disclosure, a method of performing beamforming by a first terminal includes: obtaining information regarding reception power of a reference signal transmitted to a second terminal; obtaining information regarding reception power of a source signal transmitted to the second terminal; obtaining information regarding reception power of a first combined signal that is transmitted to the second terminal and is a combination of the reference signal and the source signal; obtaining information regarding reception power of a second combined signal that is transmitted to the second terminal and is a combination of a modified source signal obtained by shifting a phase of the source signal and the reference signal; and determining a transmission beam of the first terminal, based on the information regarding the reception power of each of the reference signal, the source signal, the first combined signal and the second combined signal.

In the method of performing beamforming by the first terminal according to an embodiment of the disclosure, the determining of the transmission beam may include determining a first phase set, based on a level of reception power of each of the reference signal, the source signal, and the first combined signal; determining a second phase set, based on a level of reception power of each of the reference signal, the source signal, and the second combined signal; and determining a phase of the transmission beam, based on a common phase of the first phase set and the second phase set.

In the method of performing beamforming by the first terminal according to an embodiment of the disclosure, the first phase set may be $$\pm \arccos\left(\frac{|A_{meas1}|^2 - |A_{ref}|^2 - |A_{source}|^2}{2|A_{ref}||A_{source}|}\right),$$

the second phase set may be $$\pm \arccos\left(\frac{|A_{meas2}|^2 - |A_{ref}|^2 - |A_{source}|^2}{2|A_{ref}||A_{source}|}\right) - \varphi_{PS},$$

wherein $|A_{ref}|$ represents a level of the reception power of the reference signal, $|A_{source}|$ represents a level of the reception power of the source signal, $|A_{meas1}|$ represents a level of the reception power of the first combined signal, and $|A_{meas2}|$ represents a level of the reception power of the second combined signal.

The method of performing beamforming by the first terminal according to an embodiment of the disclosure may further include identifying whether a level of the reception power of the reference signal is within a preset threshold range, based on the information regarding the reception power of the reference signal; and transmitting another reference signal to the second terminal when the level of the reception power of the reference signal is not within the preset threshold range.

According to another aspect of the disclosure, a method of performing beamforming by a second terminal includes: transmitting information regarding reception power of a reference signal received from a first terminal to the first terminal; transmitting information regarding reception power of a source signal received from the first terminal to the first terminal; obtaining information regarding reception power of a first combined signal that is received from the first terminal to the first terminal and is a combination of the reference signal and the source signal; obtaining information regarding reception power of a second combined signal that is received from the first terminal to the first terminal and is a combination of a modified source signal obtained by shifting a phase of the source signal and the reference signal; and receiving at least one signal through a transmission beam determined based on the information regarding the reception power of each of the reference signal, the source signal, the first combined signal and the second combined signal.

In the method of performing beamforming by the second terminal according to an embodiment of the disclosure, a phase of the transmission beam may be determined, based on a common phase value of a first phase set determined based on a level of the reception power of each of the reference signal, the source signal and the first combined signal and a second phase set determined based on a level of the reception power of each of the reference signal, the source signal, and the second combined signal.

In the method of performing beamforming by the second terminal according to an embodiment of the disclosure, the first phase set may be $$\pm \arccos\left(\frac{|A_{meas1}|^2 - |A_{ref}|^2 - |A_{source}|^2}{2|A_{ref}||A_{source}|}\right),$$

the second phase set may be $$\pm \arccos\left(\frac{|A_{meas2}|^2 - |A_{ref}|^2 - |A_{source}|^2}{2|A_{ref}||A_{source}|}\right) - \varphi_{PS},$$

wherein $|A_{ref}|$ represents the level of the reception power of the reference signal, $|A_{source}|$ represents the level of the reception power of the source signal, $|A_{meas1}|$ represents the level of the reception power of the first combined signal, and $|A_{meas2}|$ represents the level of the reception power of the second combined signal.

The method of performing beamforming by the second terminal according to an embodiment of the disclosure may further include receiving another reference signal from the first terminal when a level of the reception power of the reference signal is not within a preset threshold range.

According to another aspect of the disclosure, a first terminal for performing beamforming includes a transceiver and a processor connected to the transceiver, wherein the processor is configured to: obtain, by the transceiver, information regarding reception power of a reference signal transmitted to a second terminal; obtain, by the transceiver, information regarding reception power of a source signal transmitted to the second terminal; obtain, by the transceiver, information regarding reception power of a first combined signal that is transmitted to the second terminal and is a combination of the reference signal and the source signal; obtain, by the transceiver, information regarding reception power of a second combined signal that is transmitted to the second terminal and is a combination of a modified source signal obtained by shifting a phase of the source signal and the reference signal; and determine a transmission beam of the first terminal, based on the information regarding the reception power of each of the reference signal, the source signal, the first combined signal and the second combined signal.

According to another aspect of the disclosure, a second terminal for performing beamforming includes a transceiver and a processor connected to the transceiver, wherein the processor is configured to: control the transceiver to transmit information regarding reception power of a reference signal received from a first terminal to the first terminal; control the transceiver to transmit information regarding reception power of a source signal received from the first terminal to the first terminal; control the transceiver to transmit information regarding reception power of a first combined signal that is received from the first terminal and is a combination of the reference signal and the source signal; control the transceiver to transmit information regarding reception power of a second combined signal that is received from the first terminal to the first terminal and is a combination of a modified source signal obtained by shifting a phase of the source signal and the reference signal; and receive at least one signal through a transmission beam determined based on the information regarding the reception power of each of the reference signal, the source signal, the first combined signal and the second combined signal.

MODE OF DISCLOSURE

Hereinafter, an operating principle of the disclosure will be described in detail with reference to the accompanying drawings. In the following description of the disclosure, well-known functions or constructions are not described in detail when it is determined that they would obscure the subject matter of the disclosure due to unnecessary detail. Terms to be described below should be defined in consideration of functions of the disclosure but may be variable depending on the intention of users or operators, practices, or the like. Therefore, the terms should be defined based on the whole context of the disclosure.

Advantages and features of the disclosure and methods of achieving them will be apparent from embodiments of the disclosure described in detail below, in conjunction with the accompanying drawings. However, the disclosure is not limited to the embodiments of the disclosure below and may be embodied in many different forms. Rather, the embodiments of the disclosure are provided so that this disclosure will be thorough and complete and will fully convey the concept of the disclosure to those of ordinary skill in the art. The disclosure should be defined by the scope of the claims. The same reference numerals refer to the same components throughout the specification.

In this case, it will be understood that each block of process flowcharts and combinations of the flowcharts may be performed by computer program instructions. The computer program instructions may be installed in a processor of a general-purpose computer, special-purpose computer, or other programmable data processing equipment, so that means to perform functions described in blocks of each flowchart may be produced by instructions executed by the processor of the computer or the other programmable data processing equipment. The computer program instructions may be stored in a computer usable or readable memory oriented to a computer or other programmable data processing equipment to implement functions in a particular way. Thus, an article of manufacture, including an instruction means for performing the function described in a block (or blocks) of each flowchart, may be produced by the instructions stored in the computer usable or readable memory. Because the computer program instructions may be stored in a computer or other programmable data processing equipment, the functions of the blocks of each flowchart may be provided by the instructions performing a series of operations in the computer or the other programmable data processing equipment to produce a process executable by the computer to generate a computer programmable instructions to operate the computer or the other data processing equipment.

In addition, each block may represent a module, segment, or part of code that includes one or more executable instructions for executing specified logical function(s). It should be noted that in some alternative embodiments of the disclosure, the functions described in the blocks may be performed in an order different from that described herein. For example, two blocks illustrated consecutively may be performed substantially simultaneously or performed in a reverse order according to functions corresponding thereto in some cases.

In this case, the term "unit" used in embodiments set forth herein refers to software or a hardware component, such as a field programmable gate array (FPGA) or an application-specific integrated circuit (ASIC), which performs certain functions. However, the term "unit" is not limited to software or hardware. The term "unit" may be configured to be stored in an addressable storage medium or to reproduce one or more processors. Thus, the term "unit" may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in "units" may be combined to a smaller number of components and "units" or may be divided into sub-components and "sub-units". In addition, the components and "units" may be implemented to execute one or more CPUs in a device or a secure multimedia card. In an embodiment of the disclosure, a "unit" may include one or more processors.

In the following description of the disclosure, well-known functions or constructions are not described in detail when it is determined that they would obscure the subject matter of the disclosure due to unnecessary detail. Hereinafter, embodiments of the disclosure will be described in detail with reference to the accompanying drawings.

FIG. 1 is a diagram illustrating a wireless signal/energy transmission/reception system according to an embodiment of the disclosure.

Referring to FIG. 1, the wireless signal/energy transmission/reception system may include a transmitter 110 and a receiver 120. The transmitter 110 may include a phased antenna array 112 with N radiating elements. Elements of the antenna array according to an embodiment of the disclosure may be strip radiating elements (patch elements). As another example, symmetric and asymmetric vibrators, waveguide slot radiators, other printed radiators, or the like may be used as elements of the antenna array. Each radiating element 113 in the antenna array may be connected to a controlled phase shifter 114. Phase control may be performed using a processor 115 of the transmitter 110. The processor 115 may be referred to as another term such as a transmitter controller or a set of transmitter control means.

One or more radiating antenna elements that are in the form of an array and a phase shifter may form a channel. Accordingly, an antenna may include a plurality of channels. For example, when each antenna element is a channel, each antenna may include N channels, and may include N/2 channels when two adjacent radiating elements are regarded as channels. Signals having the same magnitude and phase may be excited with respect to all elements in one channel.

The receiver 120 may include an antenna 122 connected to a detector 121. In the case of wireless energy transmission, a reception antenna circuit may be a rectenna (a rectifier antenna that converts a received signal into a DC voltage signal and supplies the DC voltage signal to a receiver for battery charging). As an antenna of the receiver 120, for example, a rectangular patch antenna may be used but other suitable antenna types may also be used. At least one of the magnitude or phase of a detected signal may be determined (e.g., measured or calculated) by the receiver 120, and measurement information may be transmitted to the processor 115 of the transmitter 110, which controls the phase of each radiating element of the antenna array 112, through a feedback channel (e.g., BLE, ZigBee, Wi-Fi, etc.) to maximize the amount of reception power of the receiver 120. The receiver 120 according to an embodiment of the disclosure may transmit, as feedback information, information about the amount of reception power of signals transmitted from the transmitter 110 to the transmitter 110.

The transmitter 110 may determine an optimal phase for all the radiating elements of the antenna array 112 of the transmitter 110, based on the feedback information received from the receiver 120, and data regarding the optimal phase may be stored in a memory, of the transmitter 110 and transmission may be performed using the stored data.

The wireless signal/energy transmission system according to the disclosure may allow transmission of energy even when the receiver 120 is moving. The transmitter 110 may identify whether the receiver 120 is moving, based on information about a received signal magnitude of the receiver 120 obtained through the feedback channel. As another example, the receiver 120 with various types of sensors (an acceleration sensor, a GPS, a gyroscope, a magnetic field sensor, etc.) may determine whether movement has started through the sensors and transmit information about the determination to the transmitter 110 through the feedback channel. In this case, the transmitter 110 may perform a process of finding a new optimal phase value of each radiating element 113 of the antenna array 112 of the transmitter 110.

According to an embodiment of the disclosure, microwave radiation may be used for wireless signal/energy transmission. However, this is only an example, and a wave of another range, e.g., a short wave, a sub-millimeter (terahertz) wave, or the like, may be used for wireless signal/energy transmission.

Figure 2:
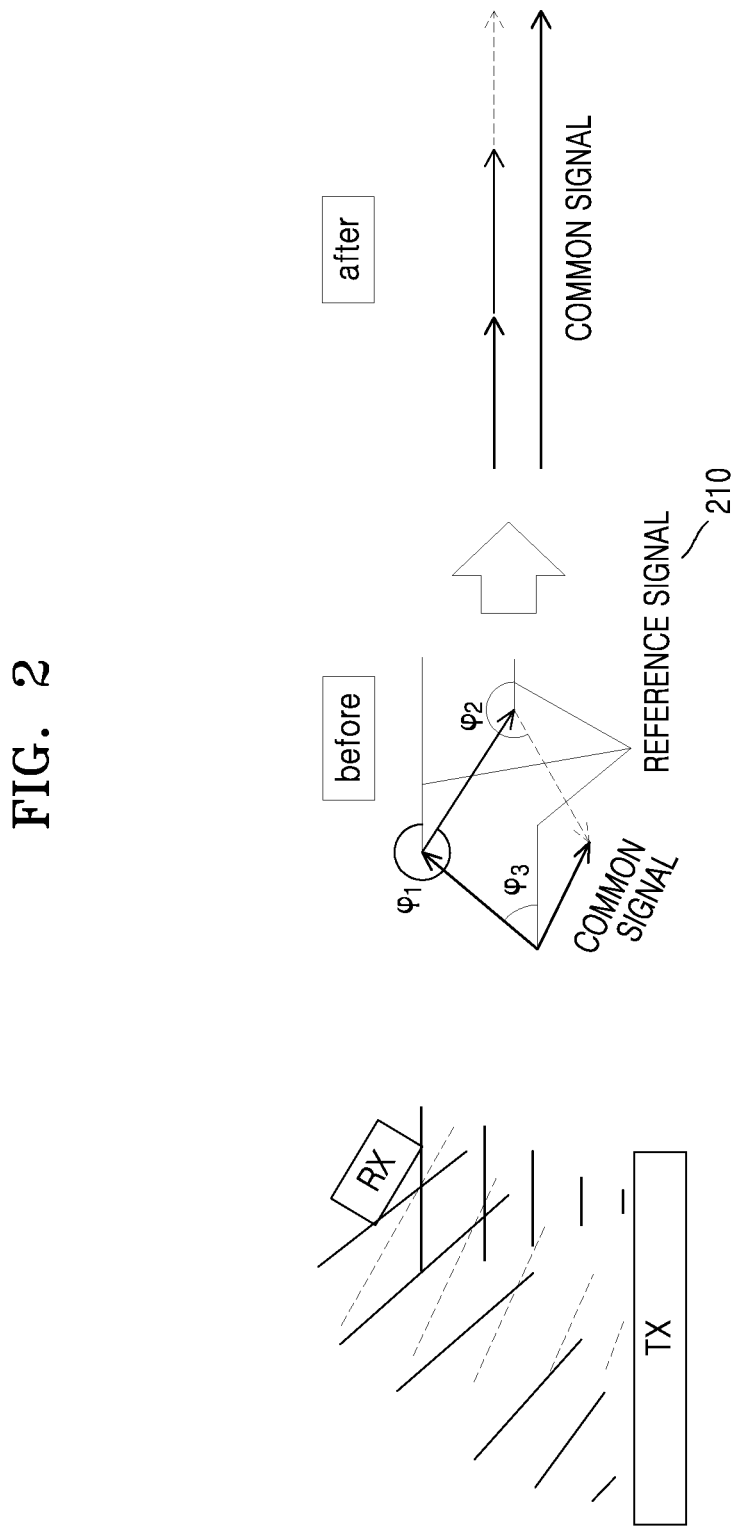
FIG. 2 is a diagram for describing a method of receiving a signal corresponding to a receiver from three radiating elements of a transmitter, according to an embodiment of the disclosure.

FIG. 2 is a diagram illustrating a method of receiving a signal corresponding to a receiver from three radiating elements of a transmitter, according to an embodiment of the disclosure.

Each signal may be expressed as a vector with a size A and a phase φ observed at the receiver. In particular, FIG. 2 illustrates three vectors provided from three different transmitters. A first vector may have a first size and a phase φ1 relative to a reference signal 210 indicated by a straight line in FIG. 2. A second vector may have a second size and a phase φ2 relative to the reference signal 210, and a third vector may have a third size and a phase φ3 relative to the reference signal 210. The sum of the three vectors described above may be a vector of the sum of signals received by the receiver. An optimization process may include a process of making all signals received by the receiver have the same phase to maximize a level of power of the sum of the received signals. To this end, for example, it is necessary to reduce the difference between the phase of all the received signals and the phase of a reference signal to zero.

In the disclosure, the optimization process is to control the phase of a transmission signal so as to provide an appropriate phase shift, based on measurement information provided through feedback from the receiver to the transmitter. In the disclosure, in order to control a channel of a phased array antenna for transmission of a signal/energy, a process of determining optimization parameter (e.g., a phase and/or a magnitude) may be described as a channel calibration of the phased antenna array. In addition, in the disclosure, the channel calibration may also be described as a process of determining a transmission beam.

Figure 3:
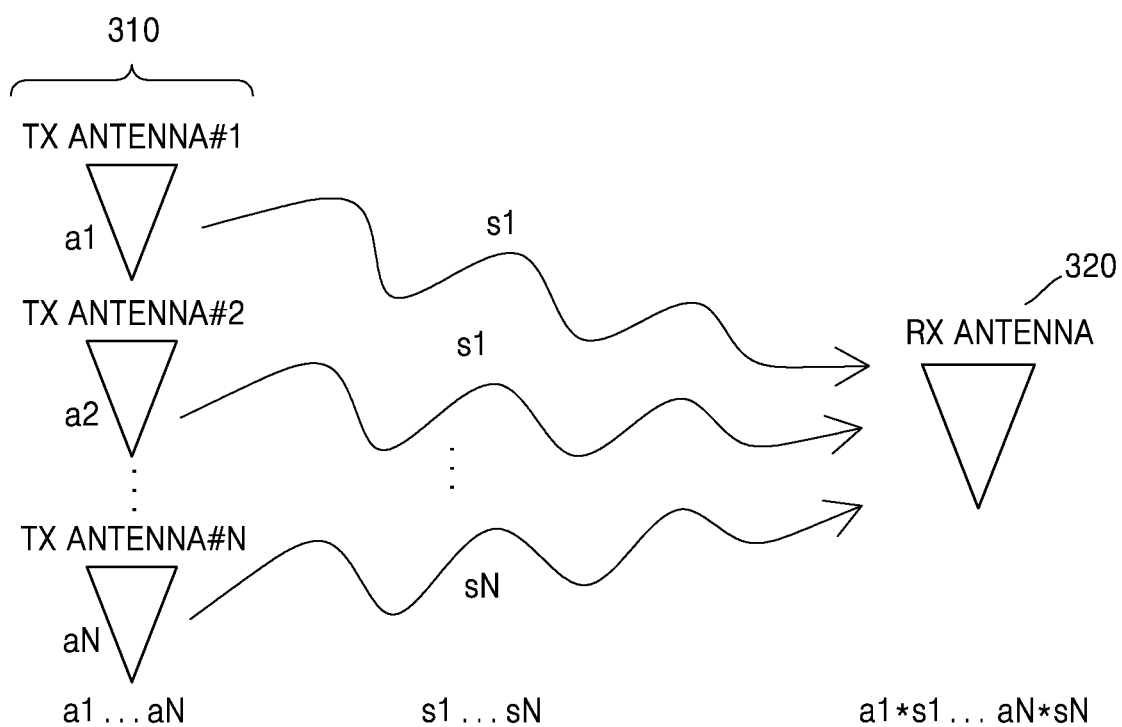
FIG. 3 is a diagram for describing transmission of a signal to a receiver from a transmitter including N antenna elements (shown as a linear array for convenience), according to an embodiment of the disclosure.

FIG. 3 is a diagram for describing transmission of a signal to a receiver from a transmitter including N antenna elements 310 (shown as a linear array for convenience), according to an embodiment of the disclosure.

An i-th antenna element of a transmitter antenna array may be excited by a signal $a_i$. Full excitation of an antenna array may be expressed as a vector of complex amplitude in a plurality of N-dimensional vector spaces, as follows:

$$\vec{A} = \begin{bmatrix} a_1 \\ a_2 \\ \dots \\ a_N \end{bmatrix}$$

In a path from the transmitter to the receiver, a signal may encounter various obstacles and undergo reflections, refraction and attenuation, etc. Signal transmission coefficients of all elements of the transmitter antenna array may be expressed as complex propagation coefficient vectors in an N-dimensional vector space.

$$\vec{S} = \begin{bmatrix} s_1 \\ s_2 \\ \dots \\ s_N \end{bmatrix}$$

The complex propagation coefficient vectors may substantially characterize a state of a propagation environment through which the signal passes in a radio frequency path from a channel of the transmitter to the receiver. In general, a coefficient $s_i$ may represent non-uniformity in the sizes and frequency characteristics of channels of an antenna array.

Ultimately, the receiver may receive a complex signal R, which corresponds to the sum of the products of the complex sizes of antenna elements and a propagation coefficient through a receiving antenna 320.

$$R = \sum_{j=1}^{N} a_j s_j$$

R may be expressed according to the above Equation, and two values in the above Equation are known values. For example, the complex signal R may be measured by the receiver, and a complex size vector $\vec{A}$ may be defined by the transmitter. As described above, an optimization process is to control a phase of components of the complex size vector $\vec{A}$ to maximize a signal magnitude at the receiver. In order to accurately set an optimization value of the complex size vector $\vec{A}$, it is necessary to find a vector $\vec{S}$ and excite each antenna element with a complex size corresponding to the vector $\vec{S}$. In order to find the vector $\vec{S}$, it may be necessary to apply N vectors of multiple sizes $\vec{A}_i$ (i=1, ..., N), which are in N different transmission phase states (N represents the number of transmitter antenna elements).

A plurality of states of the transmitter, or in other words, a plurality of vectors of complex sizes forming a state matrix of the transmitter, are as follows:

$$[A] = \begin{bmatrix} \vec{A}_1^T \\ \vec{A}_2^T \\ \vdots \\ \vec{A}_{N-1}^T \\ \vec{A}_N^T \end{bmatrix} = \begin{bmatrix} a_{11} & a_{12} & \cdots & a_{1,N-1} & a_{1,N} \\ a_{21} & a_{22} & \cdots & a_{2,N-1} & a_{2,N} \\ \vdots & \vdots & \cdots & \vdots & \vdots \\ a_{N-1,1} & a_{N-1,2} & \cdots & a_{N-1,N-1} & a_{N-1,N} \\ a_{N,1} & a_{N,2} & \cdots & a_{N,N-1} & a_{N,N} \end{bmatrix},$$

$\vec{A}_i^T$ is a coordinate representation when the vector $\vec{A}_i$ is transposed from a column vector to a row vector.

In this case, a set of received signals may be expressed as a vector of complex size $\vec{R}$.

$$\vec{R} = [A]\vec{S}$$

In the above Equation, $\vec{S}$ is an unknown N-dimensional column, and an N×N matrix [A] (because the size and phase of a radiating element are known) and the vector $\vec{R}$ (because the size and phase of a received signal are measured by the receiver) are known. The above Equation may be solved by applying an inverse matrix of the matrix [A] to $\vec{S}$ when det[A]≠0.

$$\vec{S} = [A]^{-1}\vec{R}$$

As a result, a received-signal magnitude should be a maximum value, and if $\vec{A}_{max} = \vec{S}^*$ (at fixed total transmission excitation power), channel energy efficiency may be maximized when $\vec{S}$ is known. When channel energy efficiency is maximized, it may be when a scalar sum is maximum in a complex vector space according to the Cauchy-Bunyakovsky inequality.

$$R = \langle \vec{A}, \vec{B} \rangle = \sum_{j=1}^{N} a_j^* b_j$$

When a norm of vectors corresponding to Equation $\vec{A} = C\vec{B}$, C is a constant.

In a general case, maximum energy transmission efficiency may correspond to a complex size vector having a variable size component. In the disclosure, phase control performed to find an optimal excitation vector will be described in detail. This control may be considered as determination of the optimal excitation vector.

Figure 4:
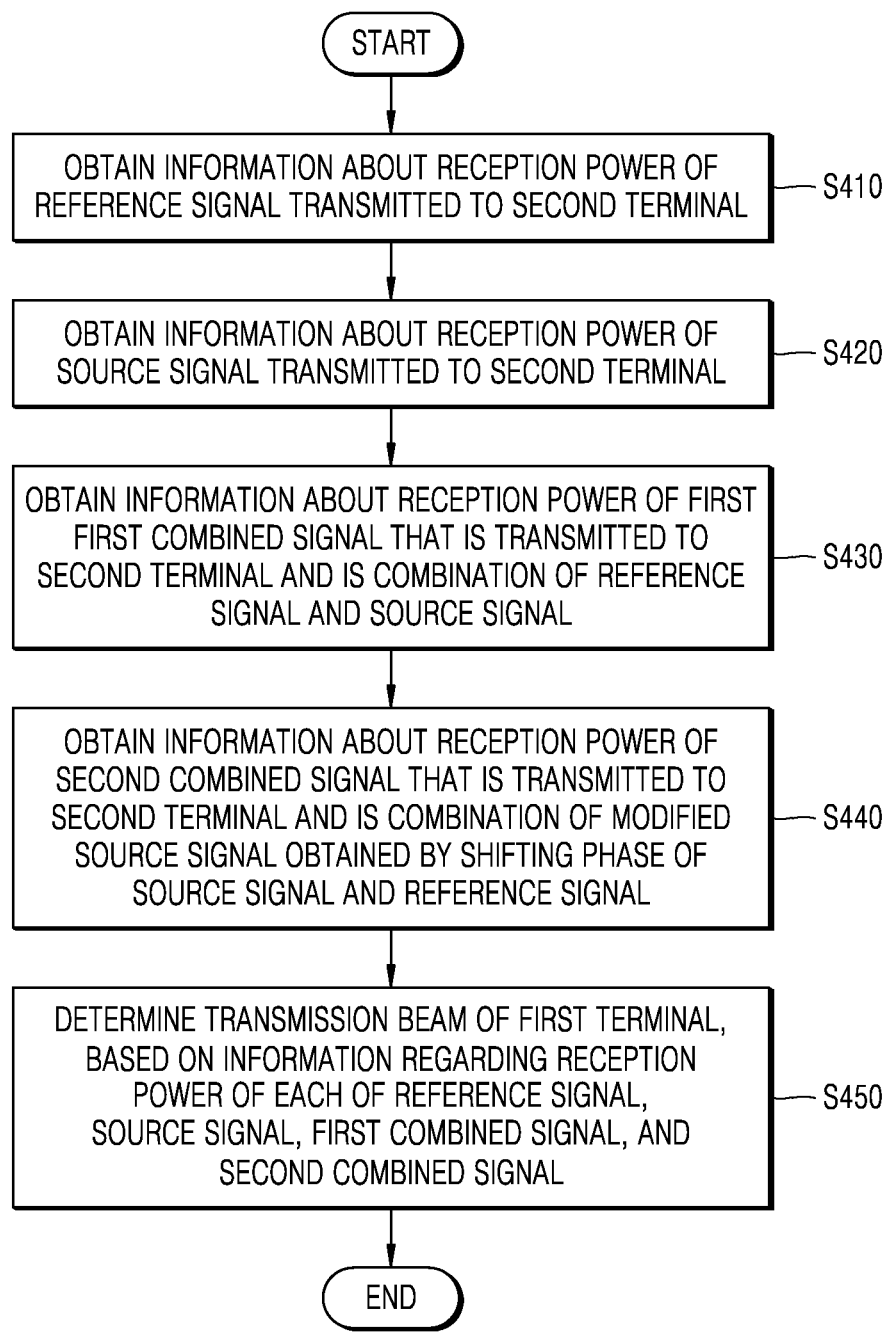
FIG. 4 is a flowchart for describing a method of performing beamforming by a first terminal, according to an embodiment of the disclosure.

FIG. 4 is a flowchart for describing a method of performing beamforming by a first terminal, according to an embodiment of the disclosure.

In the disclosure, the first terminal and a transmitter refer to the same object and may be used interchangeably. Similarly, a second terminal and a receiver also refer to the same object and may be used interchangeably.

In operation S410, the first terminal may obtain information about reception power of a reference signal transmitted to the second terminal.

According to an embodiment of the disclosure, the first terminal may transmit the reference signal to the second terminal. In addition, the first terminal may receive the information about the reception power of the reference signal as feedback on the reference signal from the second terminal. Here, the information regarding the reception power of the reference signal may include information about the level of the reception power. However, this is only an example, and the information about the reception power is not limited thereto.

In operation S420, the first terminal may obtain information about reception power of a source signal transmitted to the second terminal.

According to an embodiment of the disclosure, the first terminal may transmit the source signal to the second terminal. In addition, the first terminal may receive the information regarding the reception power of the source signal as feedback on the source signal from the second terminal. Here, the information regarding the reception power of the source signal may include the information about the level of the reception power.

In operation S430, the first terminal may obtain information about reception power of a first combined signal that is transmitted to the second terminal and is a combination of the reference signal and the source signal.

According to an embodiment of the disclosure, the first terminal may generate the first combined signal by combining the reference signal and the source signal. The first terminal may transmit the first combined signal to the second terminal. The first terminal may receive information regarding reception power of the first combined signal as feedback on the first combined signal from the second terminal. Here, the information regarding the reception power of the first combined signal may include the information about the level of the reception power.

In operation S440, the first terminal may obtain information about reception power of a second combined signal that is transmitted to the second terminal and is a combination of a modified source signal obtained by shifting the phase of the source signal and the reference signal.

According to an embodiment of the disclosure, the first terminal may obtain a modified source signal obtained by shifting the phase of the source signal by a predetermined phase value. The first terminal may generate the second combined signal by combining the modified source signal with the reference signal. The first terminal may transmit the second combined signal to the second terminal. The first terminal may receive information regarding reception power of the second combined signal as feedback on the second combined signal from the second terminal. Here, the information about the reception power of the second combined signal may include the information regarding the level of the reception power.

In operation S450, the first terminal may determine a transmission beam of the first terminal, based on the information regarding the reception power of each of the reference signal, the source signal, the first combined signal, and the second combined signal.

According to an embodiment of the disclosure, the first terminal may determine a first phase set, based on the level of the reception power of each of the reference signal, the source signal, and the first combined signal. In addition, the first terminal may determine a second phase set, based on the level of the reception power of each of the reference signal, the source signal, and the second combined signal. In addition, the first terminal may determine a phase of the transmission beam, based on a common phase value of the first and second phase sets. A method of determining a phase value for a transmission beam by the first terminal will be described in more detail with reference to FIG. 6 below.

Figure 5:
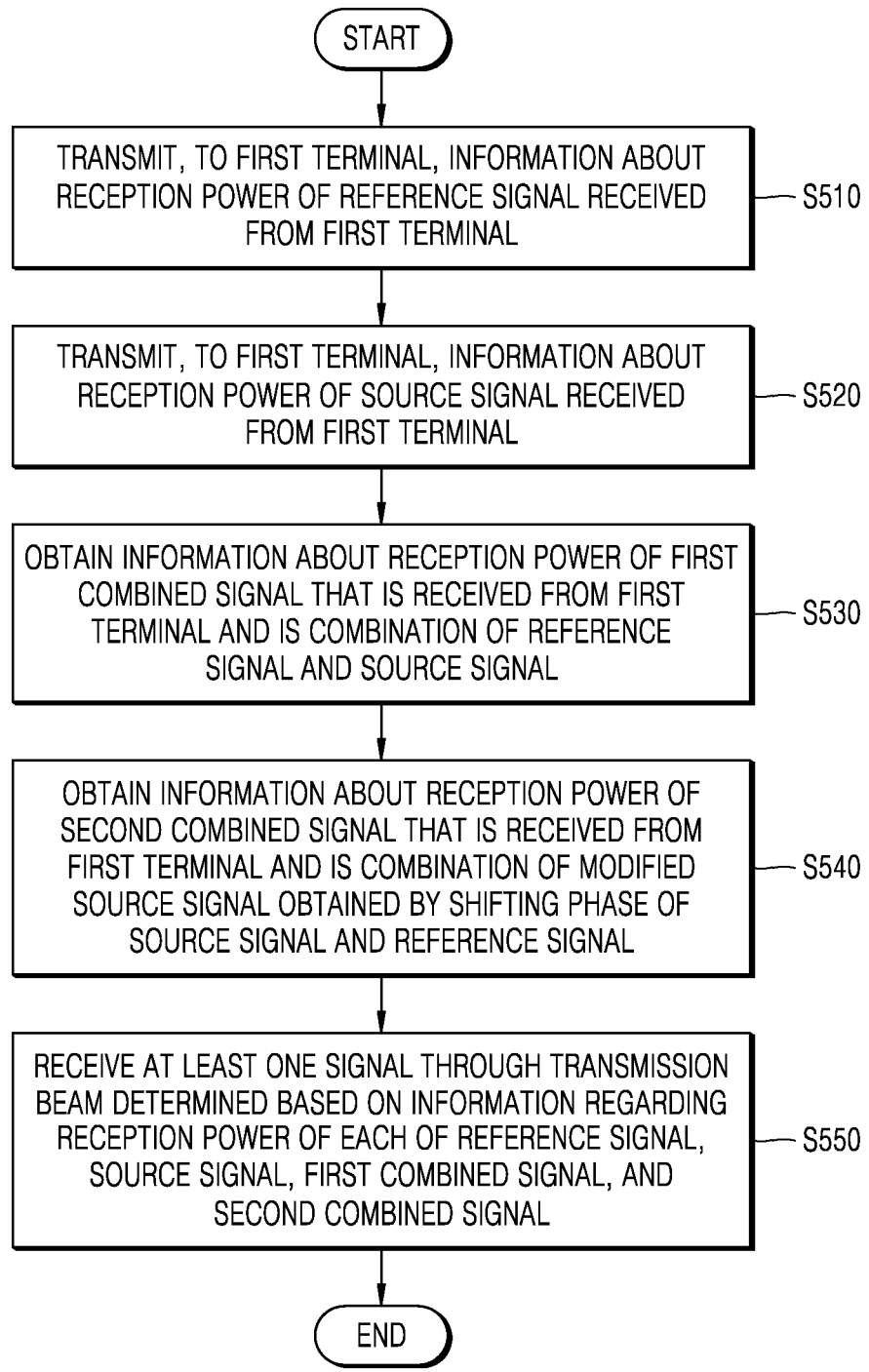
FIG. 5 is a flowchart for describing a method of performing beamforming by a second terminal, according to an embodiment of the disclosure.

FIG. 5 is a flowchart for describing a method of performing beamforming by a second terminal, according to an embodiment of the disclosure.

In operation S510, the second terminal may transmit, to a first terminal, information about reception power of a reference signal received from the first terminal.

According to an embodiment of the disclosure, the second terminal may receive the reference signal from the first terminal. In addition, the second terminal may measure the reception power of the reference signal and transmit information thereof to the first terminal through a feedback channel. The information about the measured reception power of the reference signal may include a reception power level of the reference signal and the like.

In operation S520, the second terminal may transmit, to the first terminal, information about reception power of a source signal received from the first terminal.

According to an embodiment of the disclosure, the second terminal may receive the source signal from the first terminal. In addition, the second terminal may measure the reception power of the source signal and transmit information thereof to the first terminal through a feedback channel. The information about the measured reception power of the source signal may include a reception power level of the reference signal and the like.

In operation S530, the second terminal may obtain information about reception power of a first combined signal that is received from the first terminal and is a combination of the reference signal and the source signal.

According to an embodiment of the disclosure, the second terminal may receive the first combined signal from the first terminal. In addition, the second terminal may measure the reception power of the first combined signal and transmit information thereof to the first terminal through the feedback channel. The information about the measured reception power of the first combined signal may include a reception power level of the reference signal and the like.

In operation S540, the second terminal may obtain information about reception power of a second combined signal that is received from the first terminal and is a combination of a modified source signal obtained by shifting the phase of the source signal and the reference signal.

According to an embodiment of the disclosure, the second terminal may receive the second combined signal from the first terminal. In addition, the second terminal may measure the reception power of the second combined signal and transmit information thereof to the first terminal through the feedback channel. The information about the measured reception power of the second combined signal may include a reception power level of the reference signal and the like.

In operation S550, the second terminal may receive at least one signal through a transmission beam determined based on the information regarding the reception power of each of the reference signal, the source signal, the first combined signal, and the second combined signal.

According to an embodiment of the disclosure, as a signal is received through a transmission beam determined by the first terminal, based on the information about the reception power of each of the reference signal, the source signal, the first combined signal, and the second combined signal, the magnitude of a received signal at the second terminal may have a maximum value.

Figure 6:
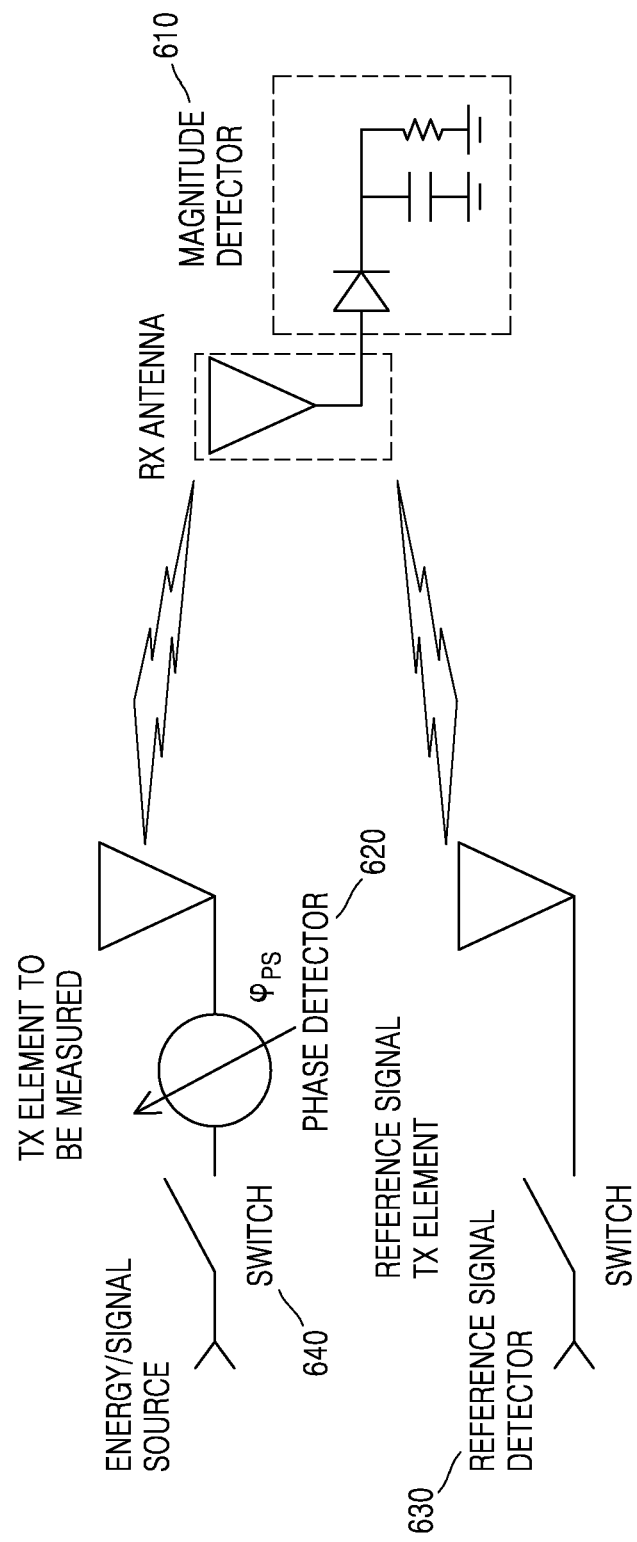
FIG. 6 is a diagram for describing in detail a method of performing beamforming in a wireless signal/energy transmission/reception system, according to an embodiment of the disclosure.

FIG. 6 is a diagram for describing in detail a method of performing beamforming in a wireless signal/energy transmission/reception system, according to an embodiment of the disclosure.

In a wireless signal/energy transmission/reception system, a transmitter may include N antenna elements and a reference signal generator. For each pair of signals Ref+$a_j$ (a reference signal+a signal of a j-th antenna element), a phase difference between a signal of the reference signal generator and a received signal may be measured by a phase detector of a receiver. The receiver may activate only a signal to be currently measured and temporarily inactivate all other signals to individually measure for each pair of signals. Ultimately, based on information about a phase and magnitude, a vector $\vec{S}$ may be generated and a power level at the receiver may be increased to a maximum value.

Accordingly, in the related art, in order to maximize channel energy efficiency, a receiver may measure the magnitude and phase of a received signal and provide a result of the measurement to a transmitter, and the transmitter may perform size control (on/off) and phase control on each element. For example, a phase detector of the receiver may measure a phase of each antenna element. However, this method may be expensive, complicated, and cumbersome.

The disclosure relates to a method of measuring a phase difference between a signal of an antenna element and a reference signal by using only a magnitude detector and calibrating a channel, based on the phase difference. The wireless signal/energy transmission system according to an embodiment of the disclosure may include the following components:

- a size detector 610 of the receiver
- a phase shifter 620 of each channel of an antenna array in the transmitter
- a reference signal source 630 (to set a phase to 0)
- a microwave switch 640 mounted on the reference signal source 630 and a radiator (to determine a phase difference from a reference signal by the receiver)

The phase difference may not be measured by the phase detector and may be derived according to the following Equation (1):

$$\varphi = \pm \arccos\left(\frac{|A_{meas1}|^2 - |A_{ref}|^2 - |A_{source}|^2}{2|A_{ref}||A_{source}|}\right), \quad (1)$$

Here,
a value $\varphi$ (phase) may be derived.
a value $|A_{ref}|$ (the magnitude of a reference signal) may be obtained through measurement by the size detector 610. In this case, a switch of a given source signal is off and a switch of the reference signal is on.

a value $|A_{source}|$ (the magnitude of the source signal) may be obtained through measurement by the size detector. In this case, the switch of the source signal is on and the switch of the reference signal is off.

a value $|A_{meas1}|$ (the magnitude of a first combined signal composed of the reference signal and the source signal) may be obtained through measurement by the size detector. In this case, both the switches of the source signal and the reference signal are on.

Figure 7:
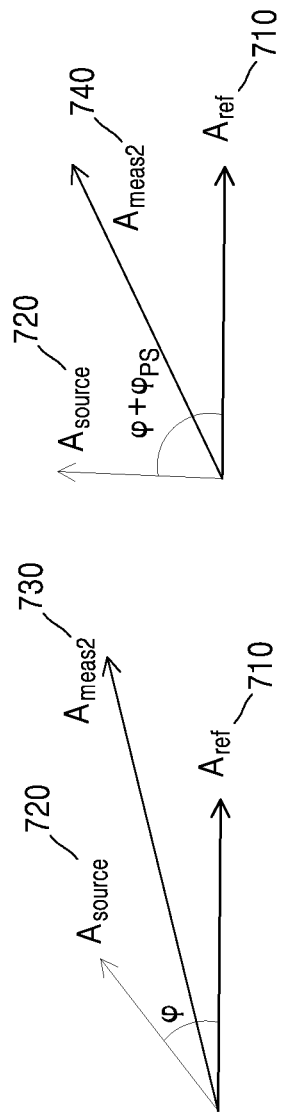
FIG. 7 is a diagram for describing a geometric representation of a reference signal, a source signal, and a first combined signal, and a geometric representation of the reference signal, the source signal, and a second combined signal.

A geometric representation of a reference signal 710, a source signal 720, and a first combined signal 730 and a geometric representation of the reference signal 710, the source signal 720, and a second combined signal 740 are as shown in FIG. 7.

All components in the right side of Equation (1) may be obtained using only the level of reception power measured by an amplitude detector on the receiver. However, because the sign ± appears in Equation (1), in order to specify a phase value for beamforming, measurement for specifying the positive (+) or negative (−) of the sign ± may be required. To this end, the transmitter may obtain a modified source signal by applying a predetermined phase shift $\varphi^{PS}$ to the source signal. The transmitter may combine the modified source signal and the reference signal to obtain a second combined signal and transmit the second combined signal to the receiver for further measurement.

As a result of the further measurement, Equation (2) below may be obtained.

$$\varphi = \pm \arccos\left(\frac{|A_{meas2}|^2 - |A_{ref}|^2 - |A_{source}|^2}{2|A_{ref}||A_{source}|}\right) - \varphi_{PS} \quad (2)$$

$|A_{meas2}|$ may represent the magnitude of the second combined signal that is a combination of the reference signal and the modified source signal.

Solutions of Equation (2) may be two values but only one of the two values may match solutions of Equation (1). The transmitter may determine the matching value as an actual phase difference value between the reference signal and the source signal.

Similarly, a determination may be made for a phase of a signal of each of remaining antenna elements. Next, a column vector $\vec{R}$ may be determined, based on the magnitude and phase of a signal from each antenna element observed as an input of the receiver. Thereafter, a vector $\vec{S}$ may be calculated, an optimal excitation vector $\vec{A}$ for setting optimization parameters (e.g., an optimal phase) for control of signal transmission may be determined based thereon, thereby calibrating a transmitter antenna element.

Therefore, it is possible to measure a phase difference between a signal of an antenna element and a reference signal, thereby optimizing a transmission signal without the phase detector of the receiver and the reference signal generator.

As described above herein, one or more antenna elements may be considered as a channel of a transmitter antenna. Thus, in general, all of the above operations are applicable to individual antenna elements, but is also applicable to channels including more than one antenna element when all antenna elements in each channel are excited by signals having the same amplitude and phase.

The operations required for the transmitter to determine a phase for beamforming may be performed by the receiver in separate calculation units or in a distributed manner, as well as the transmitter. To this end, information regarding a measurement result or an intermediate calculation result may be transmitted to a device that performs a next calculation operation. Ultimately, a processor of the transmitter, which obtains calculation results independently (completely or partially) and/or from an external device (or external devices), may obtain information for control of a channel of a transmitter antenna by adjusting a complex signal amplitude in each channel.

An order of operations of transmitting a signal to the receiver and an operation of transmitting feedback from the receiver may be different for each application. For example, in an embodiment of the disclosure, feedback may be transmitted from the receiver after measurement of each received signal. In another embodiment of the disclosure, all signals to be measured may be first transmitted to the receiver (e.g., sequentially at the same time interval or according to different protocols), and the receiver may transmit information regarding all measurement results of the received signals through feedback to the transmitter.

Figure 8:
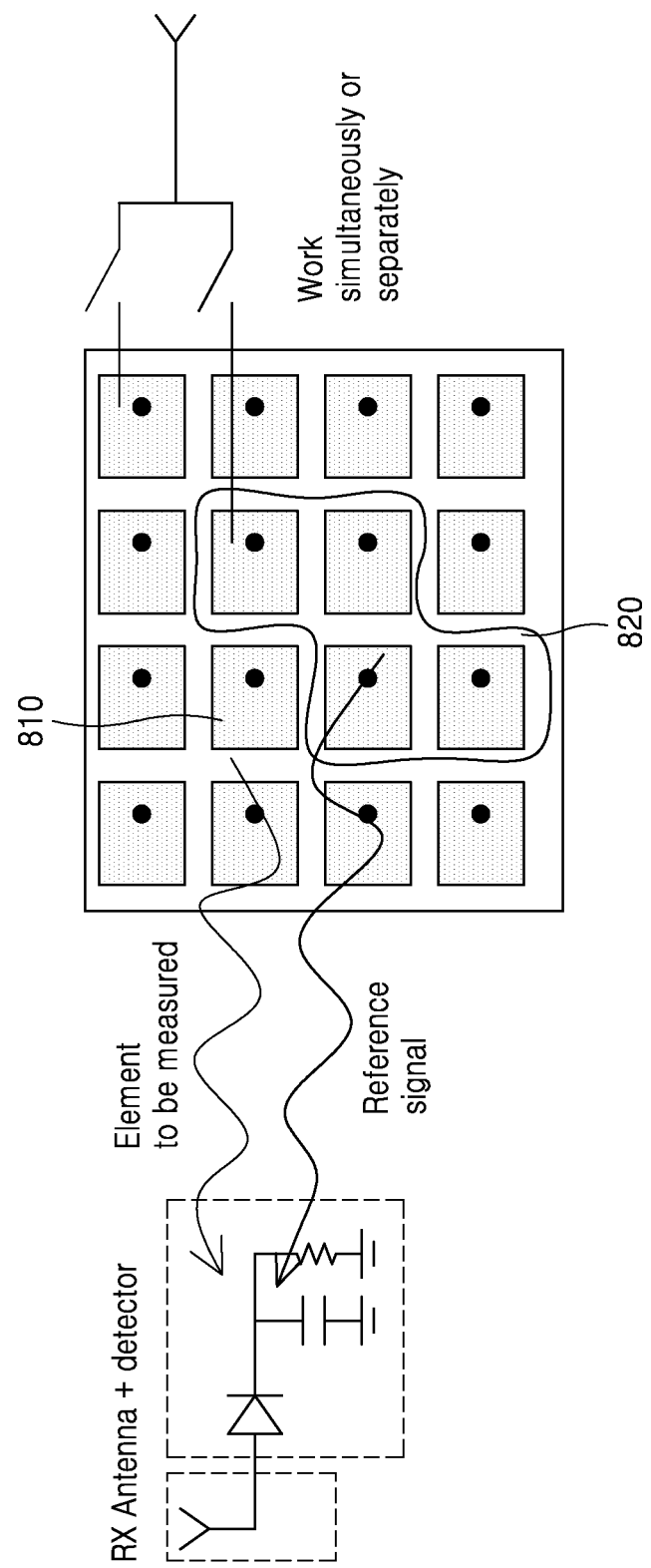
FIG. 8 is a diagram illustrating a method of generating a reference signal by a radiator group, according to an embodiment of the disclosure.

According to an embodiment of the disclosure, a separate reference signal generator may be included in the transmitter. However, this is only an example, and according to another embodiment of the disclosure, a radiator may function as a reference signal source of the transmitter instead of the separate reference signal generator. FIG. 8 is a diagram illustrating a method of generating a reference signal by a radiator group, according to an embodiment of the disclosure. For example, as illustrated in FIG. 8, a radiator group 820 other than a currently measured radiator 810 may operate as a reference signal source. The radiator 810 in which a current signal is measured and the radiator 820 other than the radiator 810 may operate simultaneously or separately.

As criteria of selecting a reference signal, an amplitude of the reference signal should be sufficiently high within a dynamic range of a detector of the receiver, and a magnitude of the reference signal should not be zero because the magnitude of the reference signal is used in the division operations in Equations (1) and (2) above. When a reference signal that satisfies the selection criteria is used, a reference signal generator and radiators may be individually designed and thus be all arranged in a single antenna array. However, this is only an example, and a reference signal generator may be additionally used for data or energy transmission.

When one of signals received by the receiver exceeds an upper limit threshold of a dynamic range of a magnitude detector, the transmitter may select another reference signal that satisfies the above criteria for a currently measured channel. Measurement and calculation operations for a current channel may be performed using another reference signal.

When a channel to be measured is included in a radiator group selected in advance as a reference signal source, another reference signal may be selected. In this case, in order to reduce a measurand, it is reasonable to obtain a reference signal by selecting a new radiator group that does not include radiators of the radiator group that was used as a reference signal source.

Unlike methods of the related art, in the disclosure, a receiver measures only a magnitude of a signal and a transmitter performs phase control and thus the receiver and the transmitter may be implemented in a simpler, more compact, and inexpensive manner.

According to another embodiment of the disclosure, a phase value for beamforming may be determined by the transmitter, based on information regarding the magnitude of a received signal without using a microwave switch. For example, the transmitter may determine a phase value by using signals transmitted from all elements of the transmitter antenna having a phase set of a special manner based on a code matrix such as a Hadamard matrix. A method of controlling a transmission beam by using a Hadamard matrix will be described with reference to FIGS. 9 to 16 below.

Figure 9:
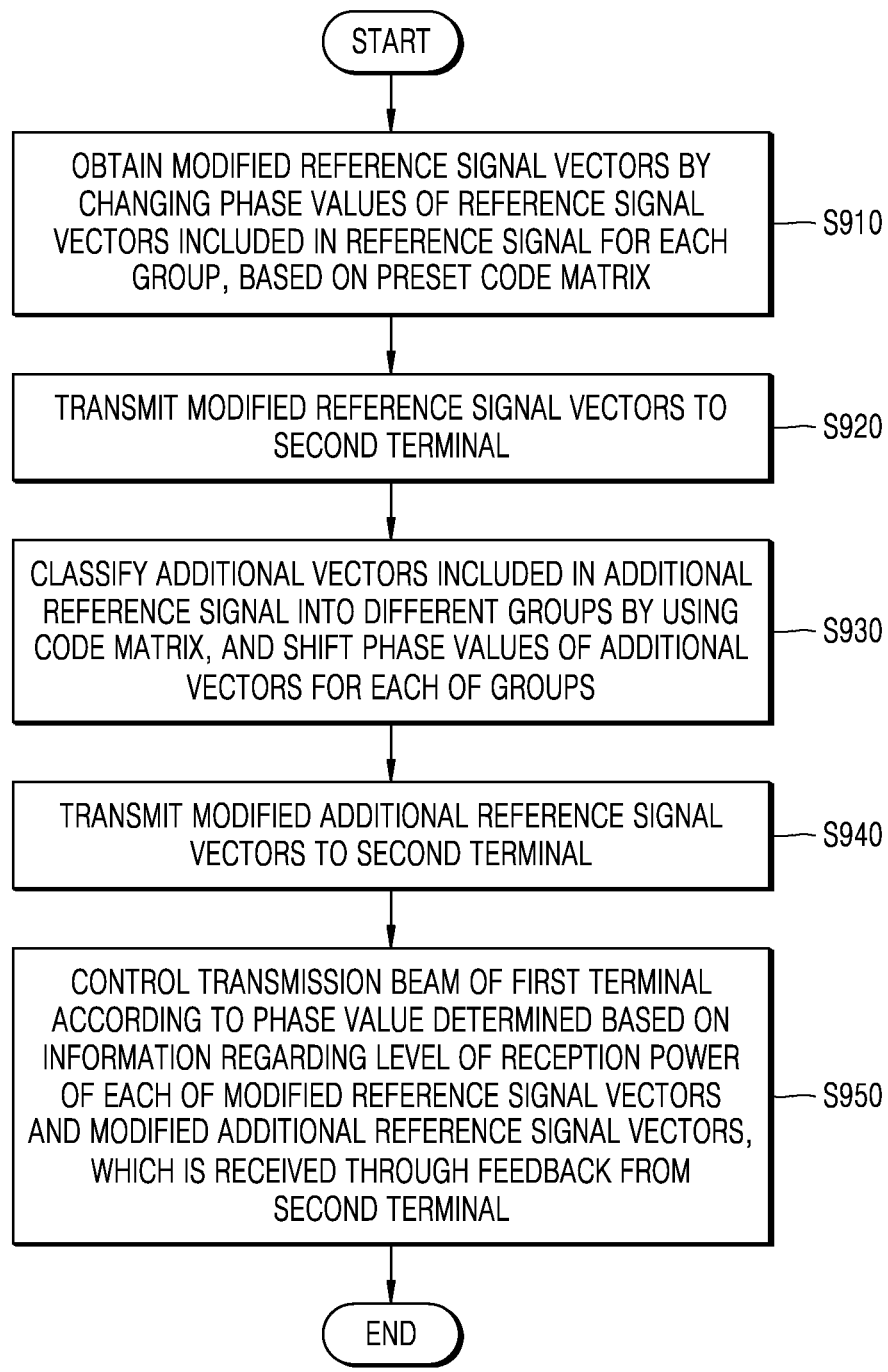
FIG. 9 is a flowchart for describing a method of controlling a transmission beam by using a Hadamard matrix, the method being performed by a first terminal, according to an embodiment of the disclosure.

FIG. 9 is a flowchart for describing a method of controlling a transmission beam by using a Hadamard matrix, the method being performed by a first terminal, according to an embodiment of the disclosure.

In operation S910, the first terminal may obtain a plurality of modified reference signal vectors by changing phase values of a plurality of reference signal vectors included in a reference signal for each group, based on a preset code matrix.

According to an embodiment of the disclosure, the first terminal may classify a plurality of reference signal vectors, the sum of which corresponds to a reference signal, into different groups by using a code matrix and shift a phase value of each reference signal vector of each of the groups. For example, the first terminal may classify a plurality of reference signal vectors into a first group and a second group by using the Hadamard matrix, and perform phase shifting for the reference signal vectors included in the first and second groups according to a phase value set for each of the first and second groups. A method of shifting a phase of each of the reference signal vectors by the first terminal will be described in more detail with reference to FIG. 11 below.

In operation S920, the first terminal may transmit a plurality of modified reference signal vectors to a second terminal.

In operation S930, the first terminal may classify a plurality of additional vectors included in an additional reference signal into different groups by using the code matrix, and shift phase values of the additional vectors for each of the groups. For example, the first terminal may classify a plurality of additional reference signal vectors into a first group and a second group by using the Hadamard matrix, and perform phase shifting for the additional reference signal vectors included in the first and second groups according to a phase value set for each of the first and second groups. A method of shifting a phase of each of the additional reference signal vectors will be described in more detail with reference to FIG. 11 below.

In operation S940, the first terminal may transmit a plurality of modified additional reference signal vectors to the second terminal.

In operation S950, the first terminal may control a transmission beam thereof according to a phase value determined based on information regarding the level of reception power of each of the plurality of modified reference signal vectors and the plurality of modified additional reference signal vectors, the information being received through feedback from the second terminal. A method of determining a phase value by the first terminal will be described in detail with reference to FIG. 11 below.

Figure 10:
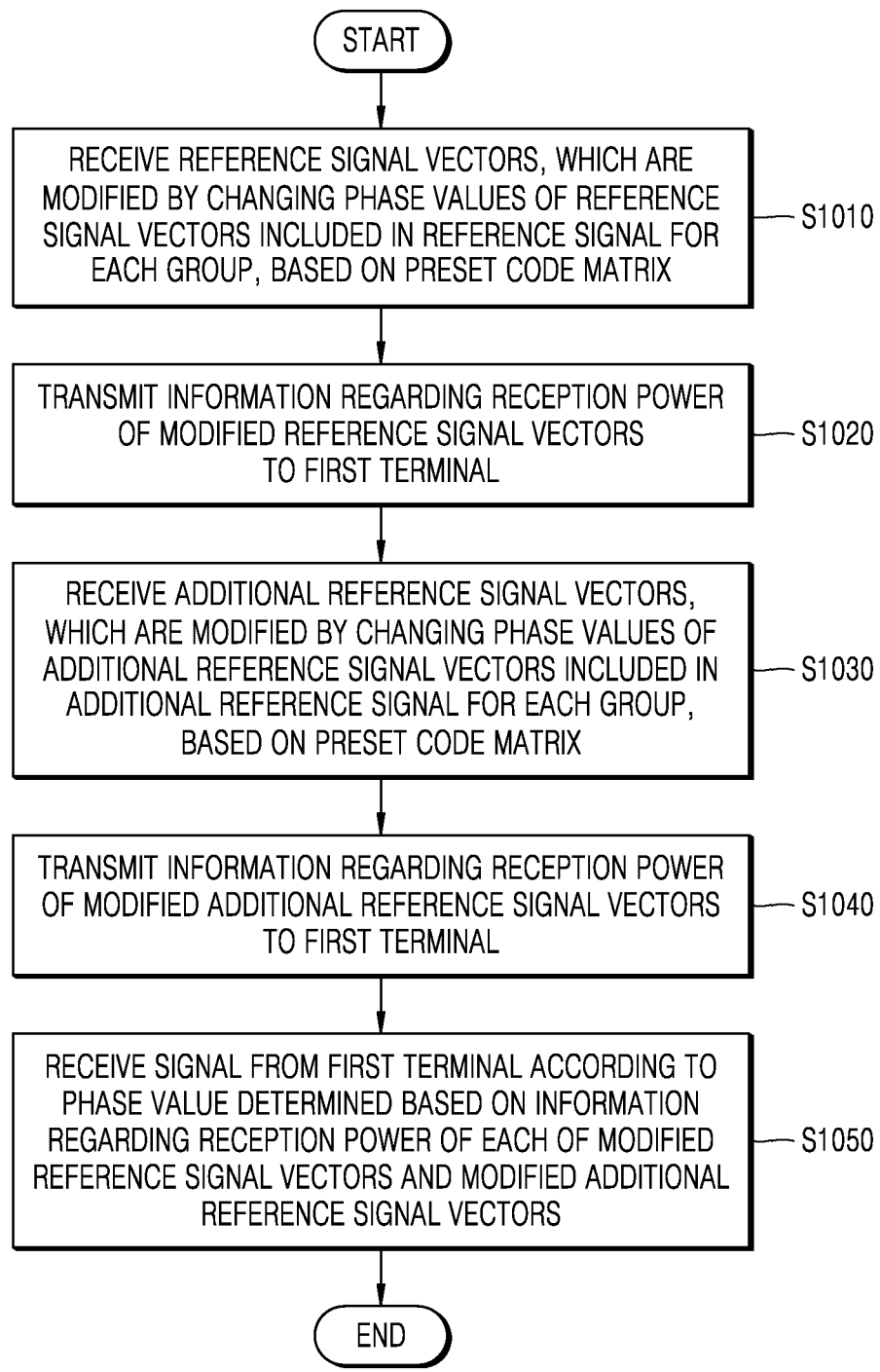
FIG. 10 is a flowchart for describing a method of receiving a signal through a transmission beam obtained using the Hadamard matrix, the method being performed by a second terminal, according to an embodiment of the disclosure.

FIG. 10 is a flowchart for describing a method of receiving a signal through a transmission beam obtained using the Hadamard matrix, the method being performed by a second terminal, according to an embodiment of the disclosure.

In operation S1010, the second terminal may receive a plurality of reference signal vectors, which are modified by changing phase values of a plurality of reference signal vectors included in a reference signal for each group, based on a preset code matrix.

In operation S1020, the second terminal may transmit information regarding reception power of the plurality of modified reference signal vectors to a first terminal. For example, the second terminal may transmit information regarding reception power of each of the plurality of modified reference signal vectors as feedback information to the first terminal.

In operation S1030, the second terminal may receive a plurality of additional reference signal vectors, which are modified by changing phase values of a plurality of additional reference signal vectors included in an additional reference signal for each group, based on the preset code matrix.

In operation S1040, the second terminal may transmit information regarding reception power of the plurality of modified additional reference signal vectors to the first terminal. For example, the second terminal may transmit information regarding reception power of each of the plurality of modified additional reference signal vectors as feedback information to the first terminal.

In operation S1050, the second terminal may receive a signal from the first terminal according to a phase value determined based on the information regarding the reception power of each of the plurality of modified reference signal vectors and the plurality of modified additional reference signal vectors.

Figure 11:
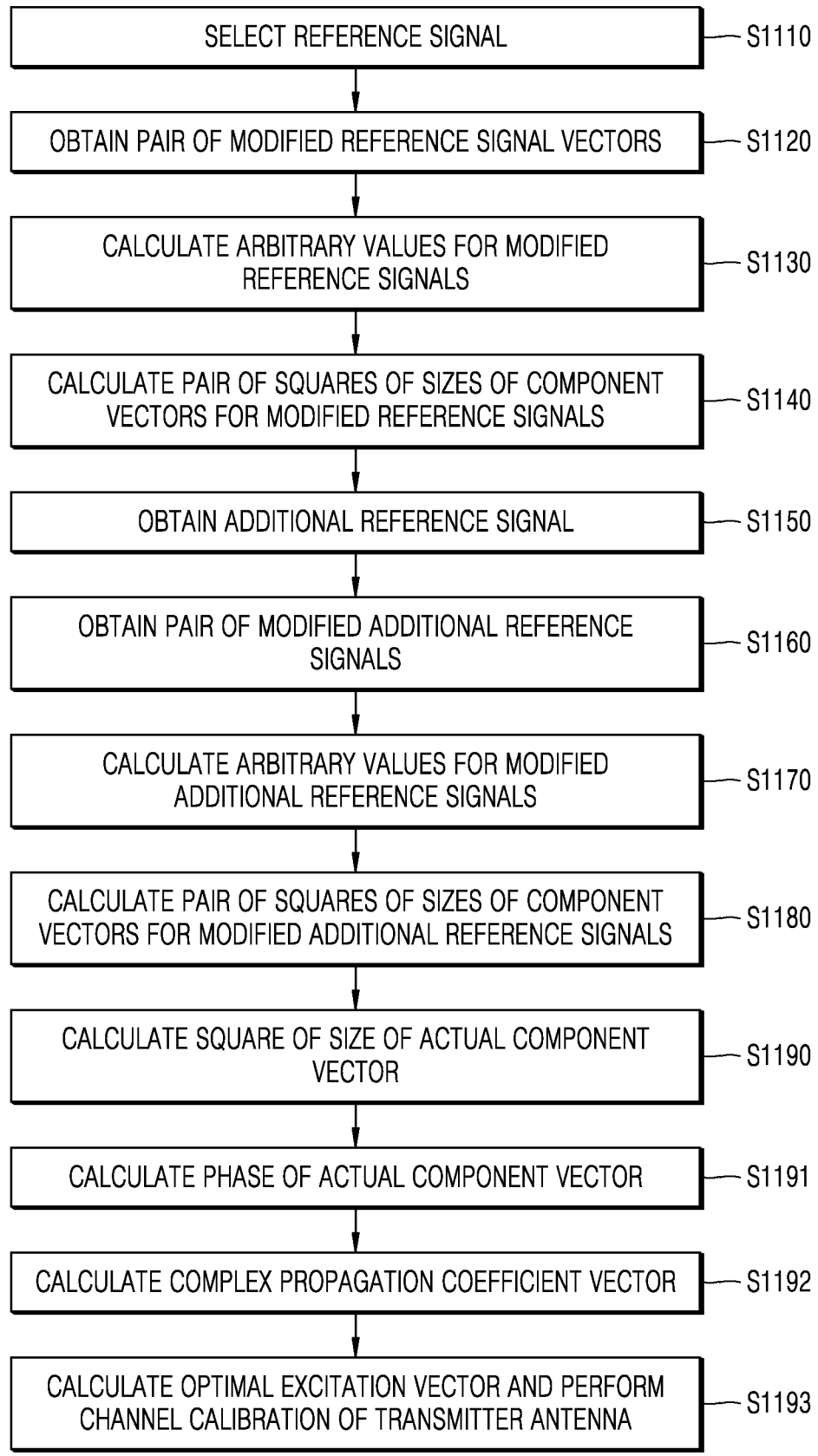
FIG. 11 is a flowchart for describing in more detail a method of controlling a transmission beam by using a Hadamard matrix, according to an embodiment of the disclosure.

FIG. 11 is a flowchart for describing in more detail a method of controlling a transmission beam by using a Hadamard matrix, according to an embodiment of the disclosure.

The Hadamard matrix is a square matrix in which elements have a value of ±1, and may satisfy the following Equation:

$$[H] \cdot [H]^T = n \cdot E_n,$$

In the above Equation, $E_n$ is an n-dimensional unit matrix.

The following iterative formula may be applied to a $2^k$-dimensional matrix (a matrix having an antenna array of a $2^k$ radiator).

$$[H_2] = \begin{bmatrix} 1 & 1 \\ 1 & -1 \end{bmatrix}$$

$$[H_{2^{k+1}}] = \begin{bmatrix} H_{2^k} & H_{2^k} \\ H_{2^k} & -H_{2^k} \end{bmatrix}$$

In order to set a phase of a radiator, a matrix [A] based on the Hadamard matrix of [H] may be used. For a phase calculation procedure, it is necessary to obtain a reference signal vector and the magnitude of a signal received by a receiver. Thereafter, correction of the reference signal vector may be applied according to a modified Hadamard matrix. For example, the reference signal vector may be modified according to a code matrix in which 1 is replaced with $\mu_1$ and −1 is replaced with $\mu_2$. Depending on characteristics of a determinant, a corrected matrix may still be inversely transformed. The modified matrix may be expressed by Equation (3) below.

$$[\hat{H}_n] = \frac{\mu_1 - \mu_2}{2}[H_n] + \frac{\mu_1 + \mu_2}{2}\text{ones}(n, n) \qquad (3)$$

Here, ones(n,n) is an n×n matrix composed of 1, a last factor in Equation (3) may be expressed as a product of $0.5*(\mu_1+\mu_2)*\text{ones}(n,1)*\text{ones}(1,n)$, and Equation (4) below may be obtained using a matrix determination theory and the definition of the Hadamard matrix in relation to $n=2^k$.

$$\det\left[\frac{\mu_1-\mu_2}{2}[H_n]+\frac{\mu_1+\mu_2}{2}\text{ones}(n,\ n)\right]==\frac{\mu_1-\mu_2}{2}\times$$
$$\left(1+\frac{\mu_1+\mu_2}{2}\times\text{ones}(1,n)\times[H_n]^T\times\text{ones}(n,\ 1)\bigg/\left(\frac{\mu_1-\mu_2}{2}\times n\right)\right)\times$$
$$\det[H_n]==\left(\left(\frac{\mu_1-\mu_2}{2}\right)^n+\left(\frac{\mu_1-\mu_2}{2}\right)^{n-1}\left(\frac{\mu_1+\mu_2}{2}\right)\right)\times\det[H_n]\ne0$$

When a matrix determinant is not zero, a linear system $[A]\vec{X}=\vec{B}$ may be resolved in terms of $\vec{X}$.

In operation S1110, a transmitter may select a reference signal. When the transmitter does not include a microwave switch, antenna elements may be associated with each other at any time, and the reference signal may be the sum of signals from all antenna elements excited by a signal with a predetermined known phase.

$$a_r^{r\_ind}=\sum_{j=1}^N s_j\exp(i\varphi_j^{r\_ind}) \quad (5)$$

In Equation 5, $$a_r^{r\_ind}$$

represents a complex reference signal from the receiver, $s_j$ is a propagation coefficient of a j-th antenna element, and $$\varphi_j^{r\_ind}$$

represents a phase of the j-th antenna element when a transmitter antenna is excited by the reference signal. r_ind=1 . . . M, M is the number of used reference signals, and a method of determining M will be described below.

According to an embodiment of the disclosure, when it is assumed that the antenna elements are excited by signals having a unit magnitude, the j-th antenna element may be regarded as 1 in Equation (5) when the transmitter antenna is excited by the reference signal. In order to perform excitation using the reference signal, it is necessary to set a phase for each element of an antenna system.

As in the previous embodiments of the disclosure, the phases of the antenna elements for obtaining the reference signal may be selected such that the magnitude of the reference signal is sufficiently high within a dynamic range of a detector of the receiver.

The above-described case may be generalized by setting the reference signal to $$a_r^{r\_ind}.$$

In operation S1110, a first reference signal r_ind=1 satisfying $a_r^1$ may be selected. Data regarding a magnitude of the first reference signal $a_r^1$ may be measured and stored in a size detector of the receiver.

Figure 12:
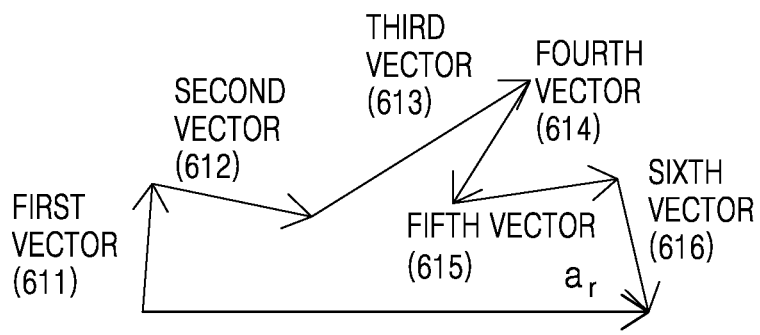
FIG. 12 is a diagram for describing a plurality of vectors serving as a reference signal according to an embodiment of the disclosure.

FIG. 12 is a diagram for describing a plurality of vectors serving as a reference signal according to an embodiment of the disclosure.

Referring to FIG. 12, for example, six vectors 611, 612, 613, 614, 615, and 616, the sum of which matches a reference signal $$a_r^{r\_ind}$$

are allocated to antennas, the sum of which matches the reference signal $$a_r^{r\_ind}.$$

For convenience of description, indices of vectors, angles, and phases may be omitted in the drawings. For example, in FIG. 12, a reference signal vector $$a_r^{r\_ind}$$

may be described as a vector $a_r$. Here, a single signal may be described as a vector, and a vector may be described as a complex number on a complex plane. An addition operation, a rotation operation (performed by multiplying complex components), and the like may be applied to vectors.

In operation S1120, the transmitter may obtain a pair of modified reference signal vectors.

In order to obtain modified reference signal vectors, the antenna elements may be divided into two groups according to a code matrix such as the Hadamard matrix. In the Hadamard matrix, a set of phases of new signals 1 may be obtained by replacing 1 with $\mu_1=\exp(i\varphi_1)$, replacing −1 with $\mu_2=\exp(i\varphi_{-1})$, and multiplying a row of a matrix by $$\exp(i\varphi_j^{r\_ind}).$$

For example, a j-th antenna element in an array may be excited by a signal with a phase $$\varphi_1+\varphi_j^{r\_ind}$$

when a j-th element in a column of the Hadamard matrix is 1, and excited by a signal with a phase $\varphi_{-1}+\varphi_j^{r\_ind}$ when the j-th element in the column of the Hadamard matrix is −1. Different arbitrary values may be selected as the phase $\varphi_1$ and $\varphi_{-1}$ within a range of $[0;\ 2\pi]$.

Figure 13:
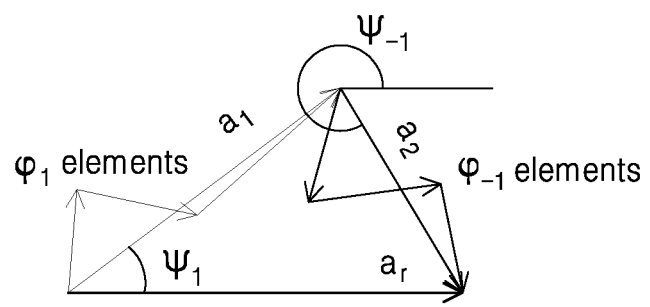
FIG. 13 is a diagram for describing a method of grouping a plurality of vectors constituting a reference signal, according to an embodiment of the disclosure.

FIG. 13 is a diagram for describing a method of grouping a plurality of vectors constituting a reference signal, according to an embodiment of the disclosure. FIG. 13 illustrates the same vectors as those shown in FIG. 12, and a transmitter may divide the vectors into two groups and modify the vectors. A first group of vectors may represent antenna elements corresponding to a value of 1 in a current row (e.g., a first row) of the Hadamard matrix, and a second group of vectors may represent antenna elements corresponding to a value of −1 in a row of the Hadamard matrix. A sum vector of the first group of vectors may be designated as a first component vector $$a_r^{r\_ind}$$

inclined at an angle of $$\Psi_1^{k,r\_ind}$$

with respect to a reference signal $$a_1^{k,r\_ind},$$

and a sum vector of the second group of vectors may be designated as a second component vector $$a_r^{r\_ind}$$

inclined at an angle of $$\Psi_1^{k,r\_ind}$$

with respect to the reference signal $$a_2^{k,r\_ind}.$$

$$a_1^{k,r\_ind} = \sum_{h_{k,j}=1} s_j \exp(i\varphi_j^{r\_ind}), \quad (6.a)$$

$$a_2^{k,r\_ind} = \sum_{h_{k,j}=-1} s_j \exp(i\varphi_j^{r\_ind}), \quad (6.b)$$

Here, $h_{kj}$ is a j-th element in a k-th row of a code matrix, and k=1 ... N

Figure 14:
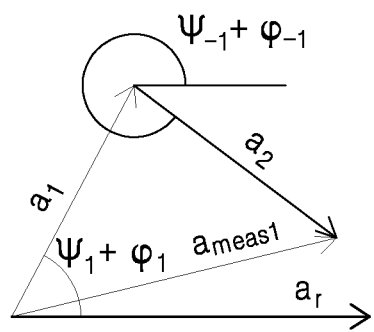
FIG. 14 is a diagram for describing modified reference-signal vectors according to an embodiment of the disclosure.

FIG. 14 is a diagram for describing modified reference-signal vectors according to an embodiment of the disclosure.

FIG. 14 illustrates a correction result of a reference signal (a result of applying phases $\varphi_1$ and $\varphi_{-1}$ to a first group of antenna elements and a second group of antenna elements). A vector $$a_r^{r\_ind}$$

inclined at angle of $$\Psi_1^{k,r\_ind} + \varphi_1$$

with respect to a reference signal $$a_1^{k,r\_ind}(\varphi_1)$$

may be formed from the sum of a first group of modified vectors, and a vector $$a_r^{r\_ind}$$

inclined at an angle of $$\Psi_{-1}^{k,r\_ind} + \varphi_{-1}$$

with respect to the reference signal $$a_2^{k,r\_ind}(\varphi_{-1})$$

may be formed from the sum of a second group of modified vectors.

$$a_1^{k,r\_ind}(\varphi_1) = \exp(i\varphi_1) \sum_{h_{k,j}=1} s_j \exp(i\varphi_j^{r\_ind}), \quad (7.a)$$

$$a_2^{k,r\_ind}(\varphi_{-1}) = \exp(i\varphi_{-1}) \sum_{h_{k,j}=-1} s_j \exp(i\varphi_j^{r\_ind}), \quad (7.b)$$

Therefore, a modified reference signal is a complex sum of signals of individual antenna elements, the magnitudes and phases of which are modified according to the code matrix. (In particular, when only phase control is performed, the modified reference signal is a complex exponential vector.)

As described above, the transmitter may obtain a first modified reference signal, which is a result of applying the phases $a_r^1$ and $\varphi_1$ to the reference signal vector $\varphi_{-1}$. $a_{meas1}^{k,1} = a_1^{k,1}(\varphi_1) + a_2^{k,1}(\varphi_{-1})$, which is data regarding a magnitude of the first modified reference signal, may be measured and stored, wherein k=1, ..., N.

A phase shift set $\varphi_1$ and $\varphi_{-1}$ may be applied to a reference signal vector $\varphi_2$, unlike the phases $\varphi_{-2}$ and $a_r^1$ previously applied to the antenna elements of the first and second groups. Different arbitrary values may be selected as the phases $\varphi_2$ and $\varphi_{-2}$ within a range of [0; 2$\pi$]. Moreover, a phase difference ($\varphi_1-\varphi_{-1}$) is not equal to a phase difference ($\varphi_2-\varphi_{-2}$), and a determinant of a matrix formed using these phases should not be zero.

$$\det \begin{bmatrix} 2(1-\cos(\varphi_1-\varphi_{-1})) & 2\sin(\varphi_1-\varphi_{-1}) \\ 2(1-\cos(\varphi_2-\varphi_{-2})) & 2\sin(\varphi_2-\varphi_{-2}) \end{bmatrix} \neq 0.$$

Accordingly, a second modified reference signal may be obtained. Data regarding a level (magnitude) of a currently modified reference signal may be measured and stored as $$a_{meas2}^{k,1} = a_1^{k,1}(\varphi_2) + a_2^{k,1}(\varphi_{-2}),$$

wherein k=1, ..., N.

In the above-described embodiment of the disclosure, only the method of controlling the phase has been described, but this method is only an example and the sizes may also be controlled.

After operations S1110 and S1120, in operation S1130, the transmitter may calculate first and second arbitrary values $a_r^1$ and $$a_1^{k,1}$$

to determine component vectors $a_2^{k,1}$ and $\eta^{k,1}$ for the reference signal $\xi^{k,1}$.

To this end, it is possible to obtain a ratio between the phases $\varphi_1$ and $\varphi_{-1}$ by using a geometric signal representation on a complex plane (especially, a cosine theory), and a magnitude and angle may be calculated as follows.

$$2(1-\cos(\varphi_1-\varphi_{-1}))\eta^{k,1} - 2\sin(\varphi_1-\varphi_{-1})\xi^{k,1} = |a_{meas1}^{k,1}|^2 - |a_r^1|^2$$

Here, a first arbitrary value $$\eta^{k,1} = |a_1^{k,1}|^2 - |a_1^{k,1}||a_r^1|\cos\Psi_1^{k,1},$$

a second arbitrary value $$\xi^{k,1} = |a_1^{k,1}||a_r^1|\sin\Psi_1^{k,1}.$$

In this case, k=1 ... N

In the above Equation, the variables $|a_r^1|$ and $$|a_{meas1}^{k,1}|_{(k=1...N)}$$

are already known values measured in operations S1110 and S1120, respectively.

A pair of first phases $\varphi_1$ and $\varphi_{-1}$ are values set in operation S1120 to control the antenna elements.

Arbitrary variables $\eta^{k,1}$ and $\xi^{k,1}$/are unknown values.

Accordingly, in order to calculate the arbitrary variable $\eta^{k,1}$ and $\xi^{k,1}$, it is necessary to measure a second pair of phases $\varphi_2$ and $\varphi_{-2}$. In addition, it is necessary to solve a linear Equation for $\eta^{k,1}$ and $\xi^{k,1}$.

$$\begin{cases} 2(1-\cos(\varphi_1-\varphi_{-1}))\eta^{k,1} - 2\sin(\varphi_1-\varphi_{-1})\xi^{k,1} = |a_{meas1}^{k,1}|^2 - |a_r^1|^2 \\ 2(1-\cos(\varphi_2-\varphi_{-2}))\eta^{k,1} - 2\sin(\varphi_2-\varphi_{-2})\xi^{k,1} = |a_{meas2}^{k,1}|^2 - |a_r^1|^2 \end{cases}$$

A solution of the system of the linear Equation is $\eta^{k,1}$ and $\xi^{k,1}$.

Accordingly, $$||a_1^{k,1}||^2$$

(square of the sizes of component vectors) may be calculated to determine a size and phase of a component vector $a_r^1$ relative to the reference signal $$a_1^{k,1},$$

as follows:

$$|a_1^{k,1}|^2 = \eta^{k,1} + \frac{|a_r^1|^2}{2} \pm \sqrt{|a_r^1|^2\left(\eta^{k,1} + \frac{|a_r^1|^2}{4}\right) - \xi^{k,12}} \quad (11)$$

In Equation (11) above, k=1 ... N is the number of rows of the code matrix. The variables on the right side of Equation (11) above are measured or calculated in a previous operation. However, a value of a result of Equation (11) above is not determined due to ±. Two methods are employed to solve Equation (11) above. One of the methods (using the "+" or "−" sign) may correspond to $$|a_1^{k,1}|^2,$$

and the other may correspond to $$|a_1^{k,1}|^2.$$

Accordingly, in operation S1140, the transmitter may calculate values of a pair of $$|a_1^{k,1}|^2$$

and $$|a_1^{k,1}|^2,$$

which are a pair of squares of the sizes of component vectors for the modified reference signals.

Additional operations S1150 to S1180 may be performed to fix ambiguity, $$a_r^{r\_ind} \text{ and } |a_1^{k,r\_ind}|^2$$

and may be calculated using a selected additional reference signal $$|a_2^{k,r\_ind}|^2,$$

and r_ind may have various values within a range of 2, ..., M. As only one of the pair of $|a_1^{k,r\_ind}|^2$ and $|a_2^{k,r\_ind}|^2$ should be specified, in operation S1150, an additional reference signal is generated. When the additional reference signal is generated, $$a_1^{k,r\_ind} \text{ or } a_2^{k,r\_ind}$$

remains unchanged, and different values r_ind may correspond to different values of k (lines of the code matrix). In order not to change one of parts of the reference signal to a given state when k is given, at least one of the phases of the antenna elements in the reference signal should be changed. For example, in $\forall k$, $\exists j_1 \ldots j_{L_k}$, $L_k \geq 1$, $\exists s_k$, $\varphi_{j_q}^{s_k} \neq \varphi_{j_q}^1$, $q=1 \ldots L_k$, $\forall j \in (j_1 \ldots j_{L_k})$ $h_{jk}=1$ when $$a_2^{k,1} = a_2^{k,s_k},$$

and $\forall j \in (j_1 \ldots j_{L_k})$ $h_{jk}=-1$ when $$a_1^{k,1} = a_1^{k,s_k}.$$

Data regarding a level (magnitude) of a current additional reference signal $$a_r^{r\_ind}$$

corresponding to a current line of the code matrix may be measured and stored. In this case, r_ind=2 . . . M In operation S1160, the transmitter may obtain a pair of modified additional reference signals, similar to operation S1120. The transmitter may change excitation signals of the antenna elements by using the pair of phases $$a_r^{r\_ind}$$

and $\varphi_1$ and the pair of phases $\varphi_{-1}$ and $\varphi_2$ with respect to the reference signal $\varphi_{-2}$ corresponding to the current line of the code matrix. The receiver may measure magnitudes of received signals $a_{meas1}^{k,r\_ind}$ and $a_{meas2}^{k,r\_ind}$.

In operation S1170, the transmitter may calculate arbitrary values for the modified additional reference signals, similar to operation S1130. Arbitrary values $\eta^{k,r-ind}$ and $\xi^{k,r-ind}$ may be calculated with respect to the pair of modified additional reference signals $a_{meas1}^{k,r\_ind}$ and $\alpha_{meas2}^{k,r\_ind}$ obtained in the previous operation.

Thereafter, in operation S1180, similar to operation S1140 described above, the transmitter may calculate a pair of squares of the sizes of component vectors $|a_1^{k,r\_ind}|^2$ and $|a_2^{k,r\_ind}|^2$ for the modified additional reference signals. In this case, k=1, . . . , N, and r_ind=2, . . . , M.

In operation S1190, the transmitter may calculate $$|a_1^{k,r\_ind}|^2$$

and $$|a_2^{k,r\_ind}|^2,$$

which are the squares of the sizes of actual component vectors. A value of one of the pair of $|a_1^{k,1}|^2$ and $|a_2^{k,1}|^2$ may be obtained in operation S1140, a constant remaining for a certain value k may be replaced with a reference signal in operation S1150, and the reference signal may be compared with the pair of $$|a_1^{k,r\_ind}|^2$$

and $$|a_2^{k,r\_ind}|^2$$

obtained in operation S1180. For each k, one of values of the pair of r_ind=1 may be the same as a value of one of the pair of r-ind≠1 under an ideal condition. This matching process is a solution to an unchanged portion of the reference signal.

In operation S1150, when a constant part of the reference signal vector is $$a_1^{k,s_k},$$

a modulus of the square of a value thereof matches a comparison result in operation S1190 and may be regarded as an actual value. When the constant part of the reference signal vector in operation S1150 is $$a_2^{k,s_k},$$

a matching result may be a modulus of the square of this value.

Figure 15:
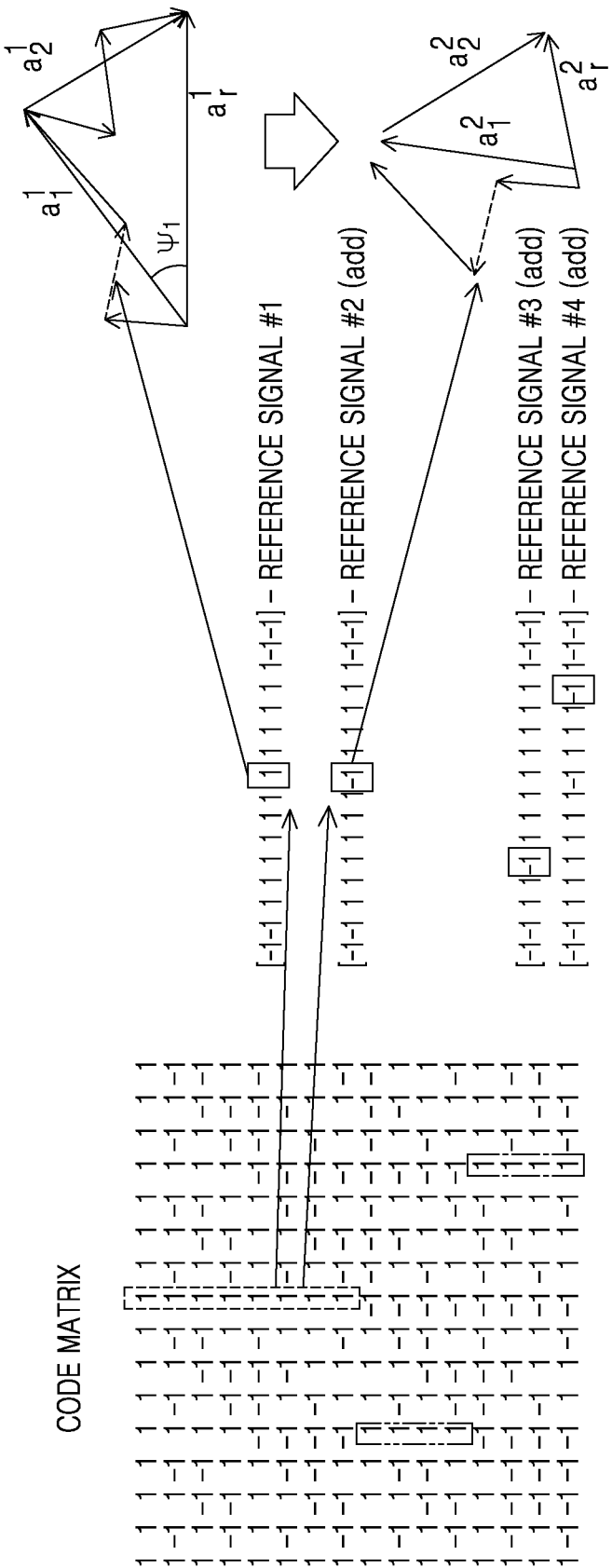
FIG. 15 is a diagram for describing a method of modifying reference-signal vectors based on the Hadamard matrix, according to an embodiment of the disclosure.

For example, referring to FIG. 15, which is a diagram for explaining a method of modifying reference signal vectors based on the Hadamard matrix, there is a 16×16 code matrix consisting of "1" and "−1" (Hadamard matrix with an order of 16 in FIG. 15), and [−1 −1 1 1 1 1 1 1 1 1 1 1 1 1 −1 −1] may be used as the first reference signal. In the code matrix, a row or a column may be selected from among rows or columns including multiple identical neighboring elements. In this case, [−1 −1 1 1 1 1 1 1 1 1 1 1 1 1−1 −1] are eight neighboring elements in a 9th column of the code matrix, four elements of a 5th column, four elements of a 13th column, and each of these elements has a value of "1". These elements may be changed to opposite elements at the reference signal. In the above example, the ninth element of the reference signal may be replaced with "−1" to obtain a (additional) reference signal #2. The fifth element of the reference signal may be replaced with "−1" to obtain a (additional) reference signal. The 13th element of the reference signal may be replaced with "−1" to obtain a (additional) reference signal #4.

After the replacing of these values, the vector $$a_2^{k,s_k} (k=1,\ldots,16, s_{1\ldots8}=2, s_{9\ldots12}=3, \text{ and } s_{13\ldots16}=4)$$

remains in an unchanged state, i.e., $$a_2^{k,s_k} = a_2^{k,1},$$

but due to a change in the sign of a given element in a row of the code matrix, one of signals of the antenna elements of the first group is obtained through another phase shift, thus resulting in a change of the vector $$a_1^{k,s_k}$$

($k=1,\ldots,16$, $s_{1\ldots8}=2$, $s_{9\ldots12}=3$, and $s_{13\ldots16}=4$). A numerical simulation of this example shows that the chosen approach is suitable for practical use.

Referring back to FIG. 11, operations of the method will be described again here. In operation S1190, when an actual value of the square of $$|a_2^{k,1}| \text{ or } |a_1^{k,1}|$$

is known, $$|a_1^{k,1}|^2 \text{ and } |a_2^{k,1}|^2$$

may be found by selecting the opposite sign in Equation (11). Therefore, for every k, the magnitudes of components of the first reference signal may be identified. Through a routing operation, the sizes $$|a_1^{k,1}|$$

of vectors are calculated as a result signal from the antenna element of the first group corresponding to values of 1 in the rows of the Hadamard matrix.

Next, in operation S1191, the transmitter may calculate a phase of an actual component vector. For vectors $$a_1^{k,1},$$

a phase $$\Psi_1^{k,1}$$

may be calculated from a reference signal vector $a_r^1$ according to Equation (12) below.

$$\cos\Psi_1^{k,1} = \frac{|a_1^{k,1}|^2 - \eta^{k,1}}{|a_1^{k,1}||a_r^1|} \quad (12)$$

$$\sin\Psi_1^{k,1} = \frac{\xi^{k,1}}{|a_1^{k,1}||a_r^1|} \quad (13)$$

An angle $$\Psi_1^{k,1}$$

may be determined in a range of 0 to $2\pi$, in which an arc sine and an arc cosine each provide two solutions. Pairs of solutions may be compared with each other and a matching result may be selected as a desired angle $$\Psi_1^{k,1}.$$

The process according to operations S1120 to S1191 may be performed for each row of the code matrix.

As can be seen from the above description, the code matrix of FIG. 11 contains lines consisting of the same elements, and in particular, the first line consists of only "1" elements. In this case, $a_1^{1,1}=a_r^1$, $|a_1^{1,1}|=|a_r^1|$, $\Psi_{1=0}$ may be known in advance. Therefore, it is not desirable to calculate rows of the same elements and thus calculation of such rows may be omitted.

In operation S1150 described above with reference to FIG. 15, in the principle of selecting an additional reference signal $a_r^{r\_ind}$ ($r\_ind=2,\ldots,M$), the same additional reference signal may be used for some rows of the code matrix to reduce the number of measurements. Moreover, in this principle, only a part a1 or a2 of every row of the code matrix may be changed.

In another embodiment of the disclosure, in operation S1150, one of some of the reference signals may be changed in a different manner from that described above. In this case, a) it is necessary to select an additional reference signal for each row of the code matrix and perform measurement, (i.e., a number M is equal to a number N), b) it is necessary to control which part of a reference signal to be accurately changed in a current iteration, and thus, it may be necessary to adjust calculation in operations subsequent to operation S1160.

In operation S1191, a complex propagation coefficient vector $\vec{S}$ may be calculated.

$$\vec{S}=[A]^{-1}\vec{R}$$

Actually, in operation S1190, sizes $$|a_1^{k,1}|$$

($k=1, \ldots, N$) of all component vectors may be obtained, and in operation S1191, phases $\Psi_1^{k,1}$ ($k=1, \ldots, N$) of all the component vectors may be obtained.

As a result, a complex vector $\vec{A}$ may be reconstructed from the above relationship with respect to a set of given excitation vectors $\vec{A}$ constituting a matrix [A]. In this case, in the matrix [A], a matrix $[\hat{H}_n]$ is an already known value and thus a vector $\vec{S}$ may be calculated.

As described above, a modified Hadamard matrix may be used as the code matrix [A] for calculation. For example, according to (3)-(4), when $\mu_1=1$, $\mu_2=0$, $$|a_1^{k,1}|$$

may be calculated only when $$\Psi_1^{k,1}$$

and $\vec{S}$ for each row of the code matrix are known.

Next, in operation S1192, the transmitter may calculate a complex propagation coefficient vector. In operation S1193, the transmitter may calculate an optimal excitation vector and perform channel calibration of a transmitter antenna. By using the calculated vector $\vec{S}$, the transmitter may obtain $\vec{A}$ to be applied to an antenna system to determine optimal phase values for guaranteeing maximum energy efficiency of transmission from the transmitter to the receiver.

$$\vec{A} = \vec{S}*$$

Therefore, a signal transmission method proposed herein allows maximum energy efficiency achievable for a radio frequency channel to maximize a signal magnitude at a given receiving point (receiver) regardless of an obstacle between the transmitter and the receiver. Moreover, the proposed approach only requires amplitude measurements by the receiver to perform phase control by the transmitter, whereas a phase detector and a reference generator at a receiving side or an additional reference generator and a microwave switch at a transmitting side are not needed, thus greatly reducing system complexity.

In the above-described method, an amplitude and phase may be calculated based on the values $$|a_1^{k,1}| \text{ and } \Psi_1^{k,1},$$

and similar calculations may be performed using similar mathematical expressions based on $$|a_2^{k,1}| \text{ and } \Psi_{-1}^{k,1}.$$

According to another embodiment of the disclosure, a phase value may be determined using the following condition for orthogonality of the Hadamard matrix. A method of determining a phase value using the orthogonality condition of the Hadamard matrix will be described in detail below.

$$\langle \vec{h}_i, \vec{h}_j \rangle = N\delta_{ij},$$

In the above Equation, $\vec{h}_k$ is a k-th column of the Hadamard matrix, N is a matrix order, $\delta_{ij}$ is a Kronecker signal, and $\langle \vec{h}_i, \vec{h}_j \rangle$ is a scalar product in an N-dimensional complex vector space. Vectors $\vec{h}_1 \ldots \vec{h}_N$ form an orthogonal basis.

$\vec{S}$ (complex propagation coefficient vector) may be expressed from bases as follows.

$$\vec{S} = \sum_{j=1}^{N} \alpha_j \vec{h}_j$$

In the above Equation, $\alpha_j$ is an unknown complex coefficient (a coordinate of a vector $\vec{S}$ at a basis), and may be a determined during a measurement process.

An excitation vector $\vec{A}$ may be set as a value of a row of a Hadamard matrix, the phase of which is 0/180 degrees using a phase shifter. Here, a phase value of 0 degrees corresponds to a value of 1 of a matrix element, and a phase value of 180 degrees corresponds to −1 of a matrix element. In this case, a complex signal input to the receiver may be expressed as follows.

$$R_k = \left\langle \vec{h}_k, \sum_{j=1}^{N} \alpha_j \vec{h}_j \right\rangle = \alpha_j N \delta_{kj} \qquad (14)$$

$|R_k|=|\alpha_j|N$, and $|\alpha_k|$ is an expansion coefficient of the vector $\vec{S}$ measured in a first step of the algorithm. The excitation vector $\vec{A}$ may be set as a linear combination of rows of a special type of the Hadamard matrix:

$$\vec{A}_{ik} = \frac{1}{\sqrt{2}} \vec{h}_i + \frac{j}{\sqrt{2}} \vec{h}_k.$$

In this case, excitation may correspond to a phase 45/135/225/315 degrees (without magnitude modulation). A phase of the coefficient $\alpha_i$ relative to the coefficient $\alpha_k$ may be regarded as a reference coefficient and determined by Equation (16) below.

$$\varphi_{ik}^1 = \arcsin\left(\frac{|\alpha_i|^2 + |\alpha_k|^2 - 2\left|\frac{R_{ik}}{N}\right|}{2|\alpha_i||\alpha_k|}\right), \qquad (16)$$

$$\varphi_{ik}^2 = \pi - \varphi_{ik}^1,$$

Here, $R_{ik}$ represents a complex signal input to the receiver and measured by the transmitter antenna excited by a vector $\vec{A}_{ik}$.

To solve the uncertainty of the determination of a phase, it is necessary to perform measurements on two reference signals. When $i=S$, $k=1 \ldots S-1, S+1 \ldots N$, $i=L$, and $k=1 \ldots S-1, S+1 \ldots N$. Here, $L \neq S$. $\vec{h}_S$ and $\vec{h}_L$ are examples of a reference signal vector. After specifying, it is necessary to sort data in order to exclude inaccurate values among phase values. A criteria for an actual value is as follows:

$\varphi_{Sk}$, $\pi-\varphi_{Sk}$, $\varphi_{SL}+\varphi_{Lk}$, $\varphi_{SL}+\pi-\varphi_{Lk}$, $\pi-\varphi_{SL}+\varphi_{Lk}$, $2\pi-\varphi_{SL}-\varphi_{Lk}$, Here, k=1 . . . N, k≠S,L.

After determining A complex expansion coefficient $\alpha_i$, a vector $\vec{S}$ may be calculated.

$$\vec{S} = \sum_{j=1}^{N} \alpha_j \vec{h}_j$$

Based on the previous calculations, optimal phase values may be calculated and applied to a transmitter antenna system, thereby maximizing a reception power level at the receiver.

$$\vec{A} = \vec{S}*$$

Figure 16:
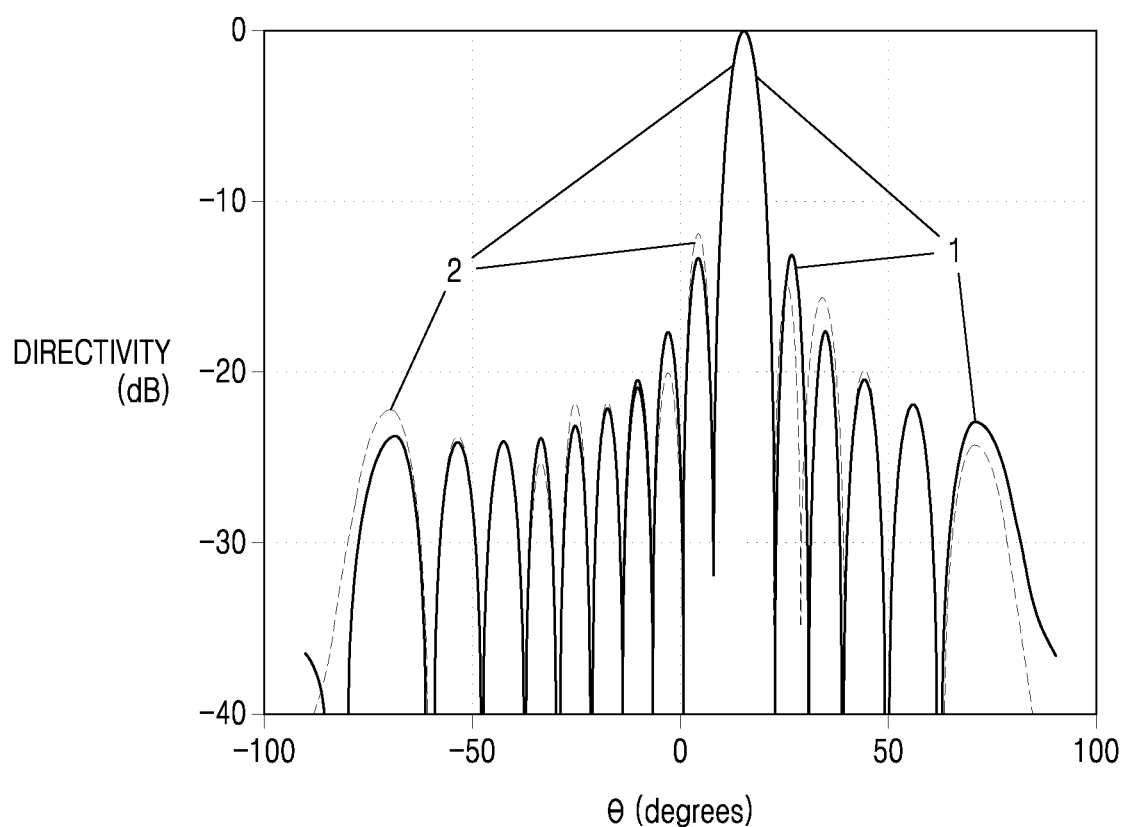
FIG. 16 is a diagram for describing a transmitter antenna array pattern obtained by performing a beamforming process, according to an embodiment of the disclosure.

A received signal strength measured as a result of controlling a beam according to a phase value determined according to an embodiment of the disclosure is illustrated in FIG. 16. In the present embodiment of the disclosure, a model in which a transmitter antenna array having sixteen elements arranged on a horizontal plane of a transmitter (TX) array at an angle of 150 degrees from a normal to a plane of the transmitter antenna array in a far area was used. In order to evaluate an effect of non-ideality of an actual implementation, the dependence of an amplitude of a signal on a phase during an operation of a radiator, i.e., an operation of a phase shifter, was considered in performance measurement.

FIG. 16 illustrates a TX array pattern obtained after performing the above-described beamforming process. As can be seen from a graph 1 at 0 dB (an ideal operation of a phase shifter) and a graph 2 at 3 dB, a beam transmitted by a beamforming method according to an embodiment of the disclosure is quite robust to a change of amplitude. Because it is possible to provide an amplitude fluctuation of 2 dB or less under actual conditions, a phase value determined by the above-described method is sufficiently close to an actual phase value, and a side lobe level may not exceed an allowable limit.

The disclosure is applicable to searching in a radial direction for wireless charging in adaptive communication systems (5G, WiGig, and Wi-Fi), 5G networks in home and office environments, smart home systems, and Internet of Things (IoT).

The disclosure provides benefits such as autofocusing for dynamic or static receivers, increased operational efficiency in multipath conditions, support for fast data transmission, improved energy transfer stability in all directions, energy savings due to signal reception/transmission optimization, increased efficiency of long-range wireless power transmission (LWPT) when there are obstacles, and the like. In particular, when used in a 5G network, a repeater located inside a room with many walls, partitions, furniture, and other objects affecting signal propagation may provide a stable signal between bases due to the principles described in the disclosure. In addition, when the principles described in the disclosure are used in LWPT, a stable level of reception power can be ensured in a room with an obstacle.

When the principles described in the disclosure are used in a Wi-Fi network, signals from various general Wi-Fi access points may be combined to increase a signal magnitude at the location of a user. This approach is convenient, for example, in Wi-Fi networks in which there are obstacles between a transmitter and a receiver, and especially, when a user is moving. Therefore, a data rate may increase and power consumption of user equipment may reduce.

In addition, the proposed method may be used to calibrate a radio path of a phased antenna array operating in a remote area (radar, communication), e.g., by placing a receiver at a predetermined position with respect to the transmitter.

In the present specification, it should be understood that terms such as "first", "second", "third", etc. may be used to describe various elements, components, regions, layers and/or sections, and these elements, components, regions, and layers thereof. "and/or" should not be limited by these terms. These terms are only used to distinguish one element, component, region, layer or section from another element, component, region, layer or section. Accordingly, a first element, component, region, layer or section may be referred to as a second element, component, region, layer or section without departing from the scope of the disclosure. As used herein, the term "and/or" includes any and all combinations of one or more of the listed items. Each components described in a singular form do not exclude a plurality of components unless otherwise specified.

The invention claimed is:

1. A method of performing beamforming by a first terminal, the method comprising:
  obtaining information regarding reception power of a reference signal transmitted to a second terminal;
  obtaining information regarding reception power of a source signal transmitted to the second terminal;
  obtaining information regarding reception power of a first combined signal transmitted to the second terminal, the first combined signal being a combination of the reference signal and the source signal;
  obtaining information regarding reception power of a second combined signal transmitted to the second terminal, the second combined signal being a combination of a modified source signal obtained by shifting a phase of the source signal and the reference signal; and
  determining a transmission beam of the first terminal based on the information regarding the reception power of each of the reference signal, the source signal, the first combined signal, and the second combined signal.

2. The method of claim 1, wherein the determining of the transmission beam comprises:
  determining a first phase set based on a level of reception power of each of the reference signal, the source signal, and the first combined signal;
  determining a second phase set based on a level of reception power of each of the reference signal, the source signal, and the second combined signal; and
  determining a phase of the transmission beam based on a common phase of the first phase set and the second phase set.

3. The method of claim 2, wherein the first phase set is $$\pm \arccos\left(\frac{|A_{meas1}|^2 - |A_{ref}|^2 - |A_{source}|^2}{2|A_{ref}||A_{source}|}\right),$$

and
wherein the second phase set is $$\pm \arccos\left(\frac{|A_{meas2}|^2 - |A_{ref}|^2 - |A_{source}|^2}{2|A_{ref}||A_{source}|}\right) - \varphi_{PS},$$

wherein $|A_{ref}|$ represents the level of the reception power of the reference signal,
wherein $|A_{source}|$ represents the level of the reception power of the source signal,
wherein $|A_{meas1}|$ represents the level of the reception power of the first combined signal,
wherein $|A_{meas2}|$ represents the level of the reception power of the second combined signal, and
wherein $\varphi_{PS}$ represents a predetermined phase shift value.

4. The method of claim 1, further comprising:
identifying whether a level of the reception power of the reference signal is within a preset threshold range, based on the information regarding the reception power of the reference signal; and
transmitting another reference signal to the second terminal when the level of the reception power of the reference signal is not within the preset threshold range.

5. A method of performing beamforming by a second terminal, the method comprising:
transmitting information regarding reception power of a reference signal received from a first terminal to the first terminal;
transmitting information regarding reception power of a source signal received from the first terminal to the first terminal;
obtaining information regarding reception power of a first combined signal received from the first terminal to the first terminal, the first combined signal being a combination of the reference signal and the source signal;
obtaining information regarding reception power of a second combined signal received from the first terminal to the first terminal, the second combined signal being a combination of a modified source signal obtained by shifting a phase of the source signal and the reference signal; and
receiving at least one signal through a transmission beam determined based on the information regarding the reception power of each of the reference signal, the source signal, the first combined signal, and the second combined signal.

6. The method of claim 5, wherein a phase of the transmission beam is determined based on a common phase value of a first phase set determined based on a level of the reception power of each of the reference signal, the source signal and the first combined signal and a second phase set determined based on a level of the reception power of each of the reference signal, the source signal, and the second combined signal.

7. The method of claim 6,
wherein the first phase set is $$\pm \arccos\left(\frac{|A_{meas1}|^2 - |A_{ref}|^2 - |A_{source}|^2}{2|A_{ref}||A_{source}|}\right),$$

and
wherein the second phase set is $$\pm \arccos\left(\frac{|A_{meas2}|^2 - |A_{ref}|^2 - |A_{source}|^2}{2|A_{ref}||A_{source}|}\right) - \varphi_{PS},$$

wherein $|A_{ref}|$ represents the level of the reception power of the reference signal,
wherein $|A_{source}|$ represents the level of the reception power of the source signal,
wherein $|A_{meas1}|$ represents the level of the reception power of the first combined signal,
wherein $|A_{meas2}|$ represents the level of the reception power of the second combined signal, and
wherein $\varphi_{PS}$ represents a predetermined phase shift value.

8. The method of claim 5, further comprising receiving another reference signal from the first terminal when a level of the reception power of the reference signal is not within a preset threshold range.

9. A first terminal for performing beamforming, the first terminal comprising:
a transceiver; and
a processor connected to the transceiver,
wherein the processor is configured to:
obtain, from the transceiver, information regarding reception power of a reference signal transmitted to a second terminal,
obtain, from the transceiver, information regarding reception power of a source signal transmitted to the second terminal,
obtain, from the transceiver, information regarding reception power of a first combined signal transmitted to the second terminal, the first combined signal being a combination of the reference signal and the source signal,
obtain, from the transceiver, information regarding reception power of a second combined signal transmitted to the second terminal, the second combined signal being a combination of a modified source signal obtained by shifting a phase of the source signal and the reference signal, and
determine a transmission beam of the first terminal based on the information regarding the reception power of each of the reference signal, the source signal, the first combined signal, and the second combined signal.

10. The first terminal of claim 9, wherein the processor is further configured to:
determine a first phase set based on a level of the reception power of each of the reference signal, the source signal, and the first combined signal;
determine a second phase set based on a level of the reception power of each of the reference signal, the source signal, and the second combined signal; and
determine a phase of the transmission beam based on a common phase of the first phase set and the second phase set.

11. The first terminal of claim 10,
wherein the first phase set is $$\pm \arccos\left(\frac{|A_{meas1}|^2 - |A_{ref}|^2 - |A_{source}|^2}{2|A_{ref}||A_{source}|}\right),$$

and
wherein the second phase set is $$\pm \arccos\left(\frac{|A_{meas2}|^2 - |A_{ref}|^2 - |A_{source}|^2}{2|A_{ref}||A_{source}|}\right) - \varphi_{PS},$$

wherein $|A_{ref}|$ represents the level of the reception power of the reference signal,
wherein $|A_{source}|$ represents the level of the reception power of the source signal,
wherein $|A_{meas1}|$ represents the level of the reception power of the first combined signal,
wherein $|A_{meas2}|$ represents the level of the reception power of the second combined signal, and
wherein $\varphi_{PS}$ represents a predetermined phase shift value.

12. The first terminal of claim 9, wherein the processor is further configured to:
identify whether a level of the reception power of the reference signal is within a preset threshold range, based on the information regarding the reception power of the reference signal; and
control the transceiver to transmit another reference signal to the second terminal when the level of the reception power of the reference signal is not within the preset threshold range.

13. A second terminal for performing beamforming, the second terminal comprising:
a transceiver; and
a processor connected to the transceiver,
wherein the processor is configured to:
control the transceiver to transmit information regarding reception power of a reference signal received from a first terminal to the first terminal,
control the transceiver to transmit information regarding reception power of a source signal received from the first terminal to the first terminal,
control the transceiver to transmit information regarding reception power of a first combined signal received from the first terminal to the first terminal, the first combined signal being a combination of the reference signal and the source signal,
control the transceiver to transmit information regarding reception power of a second combined signal received from the first terminal to the first terminal, the second combined signal being a combination of a modified source signal obtained by shifting a phase of the source signal and the reference signal, and
receive at least one signal through a transmission beam determined based on the information regarding the reception power of each of the reference signal, the source signal, the first combined signal, and the second combined signal.

14. The second terminal of claim 13, wherein a phase of the transmission beam is determined based on a common phase value of a first phase set determined based on a level of the reception power of each of the reference signal, the source signal, and the first combined signal and a second phase set determined based on a level of the reception power of each of the reference signal, the source signal, and the second combined signal.

15. The second terminal of claim 14,
wherein the first phase set is $$\pm \arccos\left(\frac{|A_{meas1}|^2 - |A_{ref}|^2 - |A_{source}|^2}{2|A_{ref}||A_{source}|}\right),$$

and
wherein the second phase set is $$\pm \arccos\left(\frac{|A_{meas2}|^2 - |A_{ref}|^2 - |A_{source}|^2}{2|A_{ref}||A_{source}|}\right) - \varphi_{PS},$$

wherein $|A_{ref}|$ represents the level of the reception power of the reference signal,
wherein $|A_{source}|$ represents the level of the reception power of the source signal,
wherein $|A_{meas1}|$ represents the level of the reception power of the first combined signal,
wherein $|A_{meas2}|$ represents the level of the reception power of the second combined signal, and
wherein $\varphi_{PS}$ represents a predetermined phase shift value.

* * * * *